United States Patent  
Biderman et al.

(10) Patent No.: US 9,027,681 B2
(45) Date of Patent: May 12, 2015

(54) HYBRID SENSOR-ENABLED ELECTRIC WHEEL AND ASSOCIATED SYSTEMS, MULTI-HUB WHEEL SPOKING SYSTEMS, AND METHODS OF MANUFACTURING AND INSTALLING WHEEL SPOKES

(75) Inventors: Assaf Biderman, Boston, MA (US); Carlo Ratti, Turin (IT); Christine Louise Outram, West Hollywood, CA (US)

(73) Assignee: Massachusetts Institute of Technology, Cambridge, MA (US)

( * ) Notice: Subject to any disclaimer, the term of this patent is extended or adjusted under 35 U.S.C. 154(b) by 127 days.

(21) Appl. No.: 12/960,461

(22) Filed: Dec. 3, 2010

(65) Prior Publication Data

US 2011/0133542 A1 Jun. 9, 2011

Related U.S. Application Data

(60) Provisional application No. 61/266,862, filed on Dec. 4, 2009, provisional application No. 61/267,071, filed on Dec. 6, 2009, provisional application No. 61/267,074, filed on Dec. 6, 2009.

(51) Int. Cl.
*B60K 1/00* (2006.01)
*B62D 61/02* (2006.01)
(Continued)

(52) U.S. Cl.
CPC ............... *B60B 1/003* (2013.01); *B60B 1/0276* (2013.01); *B60B 1/041* (2013.01); *B60B 1/042* (2013.01);
(Continued)

(58) Field of Classification Search
CPC .............. B60K 7/0007; B60K 7/00; B60K 2007/0092; B60K 2007/0038; B62J 6/12; B62K 2204/00; B62M 6/00; B62M 6/40; B62M 6/45; B62M 6/50; B62M 6/55; B62M 6/60; B62M 6/65; B62M 6/80; B62M 6/90; B60L 2200/12; B60B 27/023; B60B 27/026; B60B 27/0015; B60B 27/0068
USPC ...................... 180/65.51, 65.1, 220; 318/139, 318/255–258; 310/67 R, 67 A, 75 C; 192/64, 192/217.3–217.7
See application file for complete search history.

(56) References Cited

U.S. PATENT DOCUMENTS 3,921,741 A * 11/1975 Garfinkle et al. .......... 180/206.2
5,857,537 A * 1/1999 Matsumoto et al. ....... 180/206.5
(Continued)

FOREIGN PATENT DOCUMENTS

GB 1409379 A 10/1975
JP 1-168385 11/1989
(Continued)

OTHER PUBLICATIONS

Search Report issued on Jul. 7, 2011 in corresponding International Patent Application No. PCT/US2010/058999.
(Continued)

*Primary Examiner* — J. Allen Shriver, II
*Assistant Examiner* — James M Dolak
(74) *Attorney, Agent, or Firm* — GTC Law Group LLP & Affiliates

(57) ABSTRACT

Embodiments of hybrid sensor-enabled and autonomous electric wheels can include a plurality of systems and devices integrated into a single compact hub unit that can be retrofitted into numerous types of two-wheeled bicycles. In one embodiment, an electrically motorized bicycle wheel can include a wheel rim, a wheel hub having an electric motor, a battery pack and a control unit configured to control a drive torque of the electric motor, and a plurality of wheel spokes connecting the wheel rim to the wheel hub. The electric motor, the battery pack and the control unit can be positioned within the wheel hub of the electrically motorized bicycle wheel.

70 Claims, 19 Drawing Sheets

(51) Int. Cl.

| | |
|---|---|
| B60B 1/00 | (2006.01) |
| B60B 1/02 | (2006.01) |
| B60B 1/04 | (2006.01) |
| B60B 7/04 | (2006.01) |
| B60B 7/06 | (2006.01) |
| B60B 27/00 | (2006.01) |
| B60B 27/02 | (2006.01) |
| B60K 7/00 | (2006.01) |
| B60L 7/18 | (2006.01) |
| B60L 11/18 | (2006.01) |
| B60L 15/20 | (2006.01) |
| B62M 6/50 | (2010.01) |
| B62M 6/65 | (2010.01) |

(52) U.S. Cl.
CPC . *B60B 7/04* (2013.01); *B60B 7/061* (2013.01); *B60B 27/0068* (2013.01); *B60B 27/023* (2013.01); *B60K 7/0007* (2013.01); *B60L 7/18* (2013.01); *B60L 11/1801* (2013.01); *B60L 15/2045* (2013.01); *B60L 2200/12* (2013.01); *B60L 2220/44* (2013.01); *B60L 2270/40* (2013.01); *B60Y 2200/12* (2013.01); *B62M 6/50* (2013.01); *B62M 6/65* (2013.01); *Y02T 10/7005* (2013.01); *Y02T 10/7283* (2013.01)

(56) References Cited

U.S. PATENT DOCUMENTS

| | | | | |
|---|---|---|---|---|
| 5,937,964 | A * | 8/1999 | Mayer et al. | 180/220 |
| 6,024,186 | A * | 2/2000 | Suga | 180/291 |
| 6,260,649 | B1 * | 7/2001 | Carney, Jr. | 180/220 |
| 6,278,216 | B1 * | 8/2001 | Li | 310/67 A |
| 6,286,616 | B1 * | 9/2001 | Kutter | 180/206.5 |
| 6,296,072 | B1 * | 10/2001 | Turner | 180/220 |
| 6,347,682 | B1 * | 2/2002 | Buchner | 180/220 |
| 6,355,996 | B1 * | 3/2002 | Birkestrand | 310/54 |
| 6,516,911 | B1 * | 2/2003 | Mayer et al. | 180/220 |
| 6,571,899 | B2 * | 6/2003 | Simons | 180/220 |
| 6,580,188 | B2 * | 6/2003 | Katagiri et al. | 310/67 A |
| 6,802,385 | B2 | 10/2004 | Pyntikov et al. | |
| 6,927,524 | B2 | 8/2005 | Pyntikov et al. | |
| 6,957,129 | B2 * | 10/2005 | Hatanaka et al. | 280/210 |
| 6,971,467 | B2 | 12/2005 | Katsaros | |
| 7,275,844 | B2 * | 10/2007 | Watanabe | 310/73 |
| 7,357,209 | B2 * | 4/2008 | Kokatsu et al. | 180/206.2 |
| 7,370,720 | B2 * | 5/2008 | Kokatsu et al. | 180/206.4 |
| 7,446,444 | B2 * | 11/2008 | Iteya et al. | 310/75 C |
| 7,721,835 | B2 * | 5/2010 | Radtke | 180/205.5 |
| 7,828,101 | B2 * | 11/2010 | Radtke et al. | 180/206.5 |
| 8,056,693 | B2 * | 11/2011 | Christini et al. | 192/64 |
| 8,131,413 | B2 * | 3/2012 | Yuan | 180/220 |
| 8,220,578 | B2 * | 7/2012 | Kerschgens Long | 180/206.6 |
| 8,245,804 | B2 * | 8/2012 | van Rooij | 180/65.51 |
| 8,405,263 | B2 * | 3/2013 | Ando et al. | 310/67 A |
| 8,616,313 | B2 * | 12/2013 | Simeray et al. | 180/65.51 |
| 2005/0067207 | A1 * | 3/2005 | Radtke et al. | 180/223 |
| 2005/0167171 | A1 | 8/2005 | Katsaros | |
| 2005/0189157 | A1 * | 9/2005 | Hays et al. | 180/207 |
| 2007/0188037 | A1 * | 8/2007 | Lau | 310/152 |
| 2008/0093913 | A1 * | 4/2008 | Katsaros | 301/1 |

FOREIGN PATENT DOCUMENTS

| | | |
|---|---|---|
| JP | 7-172372 | 7/1995 |
| JP | 2000517051 A | 12/2000 |
| JP | 2002082003 A | 3/2002 |
| JP | 2002186116 A | 6/2002 |
| JP | 2002-220079 | 8/2002 |
| JP | 2002-331987 | 11/2002 |
| JP | 2005-531450 | 10/2005 |
| JP | 2008019843 A | 1/2008 |
| JP | 2008044588 A | 2/2008 |
| JP | 2009006991 A | 1/2009 |
| JP | 2009090938 A | 4/2009 |
| JP | 2009159792 A | 7/2009 |
| WO | 2011069136 A2 | 6/2011 |
| WO | 2011069136 A3 | 9/2011 |

OTHER PUBLICATIONS

Petron, Arthur. "A Bicycle Electric Assist Unit." (Sep. 14, 2010) (M.S. thesis, Massachusetts Institute of Technology) (on file with Massachusetts Institute of Technology Libraries Archives).
http://www.greenspeed.us/e_%2B_plus_electric_bicycle.htm, Date accessed: Feb. 28, 2012.
http://www.greenspeed.us/e%2B_electric_motor.htm, Date accessed: Feb. 28, 2012.
http://www.greenspeed.us/e%2B_electric_bicycle_battery.htm, Date accessed: Feb. 28, 2012.
PCT/US2010/058999, International Application Serial No. PCT/US2010/058999, International Preliminary Report on Patentability mailed Jun. 5, 2012, 8 pages.

* cited by examiner

Section B-B'

Spokes with two threaded ends.
NOT TO SCALE

HYBRID SENSOR-ENABLED ELECTRIC WHEEL AND ASSOCIATED SYSTEMS, MULTI-HUB WHEEL SPOKING SYSTEMS, AND METHODS OF MANUFACTURING AND INSTALLING WHEEL SPOKES

RELATED APPLICATIONS

This application claims the benefit of U.S. Provisional Application No. 61/267,074, filed Dec. 6, 2009, U.S. Provisional Application No. 61/267,071, filed Dec. 6, 2009, and U.S. Provisional Application No. 61/266,862, filed Dec. 4, 2009, the contents of which are incorporated herein by reference in their entirety.

TECHNICAL FIELD

The present inventive concepts generally relate to hybrid sensor-enabled electric wheels, and more particularly, to hybrid sensor-enabled and autonomous electric wheels and associated systems, such as, energy regeneration systems, braking systems, torque sensing systems, control unit systems, and locking and alarm systems. The present inventive concepts further relate to multi-hub wheel spoking systems and methods of manufacturing and installing the same.

BACKGROUND

According to some statistics, the global annual production of bicycles is roughly 100 million. At the present time, the industry appears to be experiencing steady growth, fueled in part by the increasing use of bicycles for recreation and urban transportation. In particular, electric bicycles, or e-bike usage worldwide also appears to be rapidly escalating as urban populations assess the environmental impact of fossil-fueled transportation and new regulations governing motorized transportation.

Conventional electric bicycles, or e-bikes, generally comprise an electric motor and a rechargeable battery pack, and can be separated into two categories: pedelec bicycles and all-electric bicycles. Pedelec bicycles generally comprise an electric motor that is activated only while a cyclist is pedaling, while on the other hand, all-electric bicycles can be operated solely on motorized power without pedaling.

As electric bicycle usage escalates, cyclists may wish to motorize their existing pedal bicycles. However, conventional electric conversion kits for bicycles generally comprise a large, bulky battery pack and an electric motor that are separately mounted from one another. As such, a wiring harness must be installed on the bicycle frame to provide electrical power from the battery pack to the electric motor, as well as additional wires for controlling the bike.

SUMMARY

Embodiments of the present application are directed in part to hybrid sensor-enabled and autonomous electric wheels and associated systems that have diverse applications in the area of urban mobility. In particular, embodiments of hybrid sensor-enabled and autonomous electric wheels described herein can comprise a plurality of systems and devices integrated into a single compact hub unit that can be retrofitted into numerous types of wheeled vehicles. In this manner, the wheels described herein can be mounted to various types of bicycles or wheel vehicles in a 'plug and play' manner so as to turn existing conventional pedal bicycles or other wheeled vehicles into electric powered vehicles without a need to for additional wiring or components.

In some embodiments, the wheel can be controlled in response to a torque applied at the pedals of bicycle. In some embodiments, the wheel can be controlled in response to control commands transmitted from a wireless device, such as, a cellular telephone.

Embodiments of the present application are further directed to two-wheeled bicycles comprising a preinstalled hybrid sensor-enabled and autonomous electric wheel having a plurality of systems and devices integrated into a single compact hub unit.

Embodiments of hybrid sensor-enabled and autonomous electric wheels described herein can comprise an electric motor, one or more batteries or energy storing devices, a control unit and one or more optional sensor systems, such as location sensor systems and/or environmental sensor systems that can be integrated within a wheel hub of a hybrid sensor-enabled and autonomous electric wheel.

In some embodiments, the hybrid sensor-enabled and autonomous electric wheel can be fully controlled via bicycle pedals by sensing torque that is applied by a cyclist. For example, when a cyclist applies a positive torque to the wheel via bicycle pedals, the hybrid sensor-enabled and autonomous electric wheel supplements the positive torque applied by the cyclist by a predetermined amount. That is, for example, an electric motor of the wheel provides a predetermined amount of positive torque in addition to the torque applied by the cyclist. In another example, when a cyclist applies negative torque (e.g., activates a pedal brake, back-pedals) the hybrid sensor-enabled and autonomous electric wheel supplements the negative torque applied by the cyclist. That is, for example, an electric motor of the wheel generates a supplemental negative torque. In some embodiments, the energy generated by the supplemental negative torque is transferred and/or stored in one or more batteries or energy storing devices of the wheel.

In some embodiments, a smartphone can be configured to communicate with the hybrid sensor-enabled and autonomous electric wheel via Bluetooth, or other wireless protocol, and can access and receive various types of data collected by sensors of the wheel. The smartphone can also be used to configure the data collection processes of the wheel. For example, the smartphone can configure a control unit and sensor systems of the wheel to collect various types of environmental and location data, which can be accessed and retried by the smartphone.

The smartphone can also be used to control operational modes of the hybrid sensor-enabled and autonomous electric wheel. For example, a cyclist can configure the wheel to operate in an energy regeneration mode or exercise mode such that an electric motor of the wheel generates and transfers electrical energy to one or more batteries or energy storing devices of the wheel while the cyclist is pedaling. The cyclist can further configure the magnitude of the predetermined amount of applied positive torque.

Embodiments of the present application are further directed to wheel spoking systems, methods of spoking wheels, and methods of manufacturing wheel spoking systems. A wheel spoking system can comprise a plurality of wheel spokes connected between a wheel rim and a wheel hub. In one embodiment, first and second ends of each of the plurality of wheel spokes are connected to the wheel rim, and a curved portion of each of the plurality of wheel spokes are connected to the wheel hub. For example, the curved portion of each of the plurality of wheel spokes can interface with curved spoke pockets of the wheel hub. In other embodiments, the curved portion of each of the plurality of wheel spokes can interface with hooks, fasteners and or protrusions of the wheel hub.

In this manner, the systems and methods of wheel spoking described herein removes the requirement of a spoke flange on the wheel hub, and further provides a seamless connected between the wheels spokes and exterior surfaces of the wheel hub. Such systems and methods can provide for faster spoking of wheels over conventional systems and methods, and allows for greater variety of forms of wheel hubs.

In one aspect, an electrically motorized, retrofitable vehicle wheel, comprises: a motorized hub unit connected to a wheel rim; and a mechanical coupling mechanism constructed and arranged to secure the motorized hub unit to a non-motorized wheeled vehicle.

In some embodiments, the mechanical coupling mechanism is further constructed and arranged to wirelessly secure the motorized hub unit to a non-motorized wheeled vehicle.

In some embodiments, the non-motorized wheeled vehicle comprises a bicycle.

In some embodiments, the motorized hub unit comprises: an electric motor; a control unit configured to control a drive torque of the electric motor; and a power source electrically connected to the control unit and the electric motor.

In some embodiments, the electric motor, the control unit and the power source are provided within an outer casing of the motorized hub unit.

In some embodiments, the wheel further comprises a torque sensor configured to determine a torque applied to a sprocket of the motorized wheel hub, wherein the control unit adjusts a drive torque of the electric motor in response to the applied torque.

In some embodiments, the control unit adjusts a drive torque of the electric motor in response to a command signal wirelessly received from a wireless control unit or a cell phone.

In another aspect, an electrically motorized bicycle wheel, comprises: a wheel rim; a wheel hub, including: an electric motor; a battery pack; and a control unit configured to control a drive torque of the electric motor; and a plurality of wheel spokes connecting the wheel rim to the wheel hub, wherein the electric motor, the battery pack and the control unit are positioned within the wheel hub.

In some embodiments, the electric motor comprises a frameless rotary motor.

In some embodiments, the electric motor comprises a rotor and a stator.

In some embodiments, the battery pack comprises a plurality of rechargeable battery cells.

In some embodiments, the plurality of rechargeable battery cells comprise a plurality of lithium polymer batteries.

In some embodiments, the battery pack comprises at least two parallel-connected sets of at least two series-connected rechargeable batteries.

In some embodiments, the at least two parallel-connected sets of at least two series-connected rechargeable batteries comprises three parallel-connected sets of six series-connected rechargeable batteries.

In some embodiments, the battery pack is removable from the wheel hub.

In some embodiments, the wheel hub further includes a wheel hub gear system.

In some embodiments, the wheel hub gear system comprises an automatic shifting gear system.

In some embodiments, the automatic shifting gear system comprises a 3-speed automatic shifting gear system.

In some embodiments, the wheel hub gear system comprises a manual shifting gear system.

In some embodiments, the wheel hub gear system is partially positioned within the wheel hub.

In some embodiments, the wheel hub gear system comprises at least one gear sprocket constructed and arranged to engage a bicycle chain.

In some embodiments, the bicycle chain is arranged to engage a pedal sprocket, and wherein the pedal sprocket is connected to bicycle pedals.

In some embodiments, a cyclists torque applied to the bicycle pedals is transferred to the at least one gear sprocket of the wheel hub gear system.

In some embodiments, the wheel hub further includes a coaster brake connected to the wheel hub gear system.

In some embodiments, the coaster brake is constructed and arranged to be secured to a bicycle frame.

In some embodiments, mechanical braking occurs through the coaster brake and the inner wheel hub gear system.

In some embodiments, mechanical braking is activated in response to back-pedaling.

In some embodiments, first and second ends of each of the plurality of wheel spokes are connected to the wheel rim, and a curved portion of each of the plurality of wheel spokes interface with curved spoke pockets of the wheel hub.

In some embodiments, the curved spoke pockets are formed in external side surfaces of the wheel hub.

In some embodiments, the curved portion of each of the plurality of wheel spokes is positioned at a mid-point of each of the plurality of wheel spokes.

In some embodiments, wherein an angle of the plurality of wheel spokes ranges between about 20 degrees and about 60 degrees.

In some embodiments, a vertex of the angle is formed at the curved portion of each of the plurality of wheel spokes.

In some embodiments, the angle of the plurality of wheel spokes is about 40 degrees.

In some embodiments, the plurality of wheel spokes comprises a first set of wheel spokes and a second set of wheel spokes.

In some embodiments, first and second ends of the wheel spokes of the first and second sets are connected to the wheel rim, a curved portion of each of the wheel spokes of the first set interface with curved spoke pockets on a first external side surface of the wheel hub, and a curved portion of each of the wheel spokes of the second set interface with curved spoke pockets on a second external side surface of the wheel hub.

In some embodiments, the wheel spokes of the first and second sets are alternately connected around an inner circumference of the wheel rim.

In some embodiments, the wheel hub further includes a removable battery cover.

In some embodiments, the wheel hub comprises a milled aluminum wheel hub.

In some embodiments, the wheel hub comprises a rotating unit and a static unit.

In some embodiments, the rotating unit rotates in relation to the wheel rim.

In some embodiments, the plurality of wheel spokes are connected to external side surfaces of the rotating unit.

In some embodiments, a stator of the electric motor is secured to the static unit.

In some embodiments, a rotor of the electric motor is secured to the rotating unit.

In another aspect, an electrically motorized bicycle wheel, comprises: a wheel rim; a wheel hub, including: an electric motor having a rotor and a stator; a wheel hub gear system connected to one of the rotor and the stator; a torque sensing system; a battery pack; and a control unit configured to control a drive torque of the electric motor; and a plurality of wheel spokes connecting the wheel rim to the wheel hub, wherein the electric motor, the torque sensing system, the battery pack and the control unit are positioned within the wheel hub.

In some embodiments, the torque sensing system is constructed and arranged to measure a cyclist torque applied to the wheel hub gear system.

In some embodiments, the torque sensing system is constructed and arranged to measure a rotational velocity of the wheel hub gear system.

In some embodiments, the wheel hub gear system comprises an automatic shifting gear system.

In some embodiments, the automatic shifting gear system comprises a 3-speed automatic shifting gear system.

In some embodiments, the wheel hub gear system comprises a manual shifting gear system.

In some embodiments, the wheel hub gear system is partially positioned within the wheel hub.

In some embodiments, the wheel hub gear system comprises at least one gear sprocket arranged to engage a bicycle chain.

In some embodiments, the torque sensing system comprises an inner sleeve secured to the wheel hub gear system.

In some embodiments, the inner sleeve is welded on to the wheel hub gear system.

In some embodiments, the inner sleeve rotates in relation with the wheel hub gear system.

In some embodiments, the torque sensing system further comprises an outer sleeve and a proximity sensor.

In some embodiments, when a torque is applied to one of the inner and outer sleeves, the inner sleeve rotates in a clockwise or counterclockwise direction.

In some embodiments, the rotation of the inner sleeve causes a ramp of the inner sleeve to ride up or down a ramp of the outer sleeve.

In some embodiments, an interaction between the inner sleeve and the outer sleeve affect a lateral displacement of the inner sleeve with respect to the outer sleeve.

In some embodiments, the cyclist torque is obtained from a lateral displacement between the inner sleeve and the outer sleeve.

In some embodiments, the proximity sensor determines a lateral displacement between the inner sleeve and the outer sleeve.

In some embodiments, the torque sensing system comprises an inner sleeve, an outer sleeve and a displacement sensor.

In some embodiments, the displacement sensor comprises spring/elastomer and a pressure sensor.

In some embodiments, the spring/elastomer and the pressure sensor are provided on the outer sleeve.

In some embodiments, the torque sensing system comprises an inner sleeve, an outer sleeve and a velocity sensor, wherein the velocity sensor comprises a plurality of magnets provided in an alternating configuration on an outer surface of the inner sleeve and a hall effect sensor.

In some embodiments, the outer sleeve comprises a spring/elastomer mechanism, the spring/elastomer mechanism being provided in a cylindrical housing of the outer sleeve, and configured to provide a gap region so that a notch of the inner sleeve can be positioned in the gap region.

In another aspect, an electrically motorized bicycle wheel, comprises: a wheel rim; a wheel hub, including: an electric motor comprising a rotor and a stator; a wheel hub gear system connected to one of the rotor and the stator; a battery pack; and a control unit configured to control a drive torque of the electric motor in response to a cyclist torque applied to the wheel hub gear system; and a plurality of wheel spokes connecting the wheel rim to the wheel hub, wherein the electric motor, the battery pack and the control unit are positioned within the wheel hub.

In some embodiments, when a cyclist applies a positive torque to the wheel hub gear system via bicycle pedals, the control unit commands the electric motor to supplement the positive torque applied by the cyclist by a predetermined amount.

In some embodiments, when a cyclist applies a negative torque to the wheel hub gear system via bicycle pedals, the control unit commands the electric motor to generate a negative torque on the wheel hub gear system.

In some embodiments, the electric motor is configured as a generator when generating the negative torque on the wheel hub gear system.

In some embodiments, energy generated by the electric motor when generating the negative torque is transferred to and stored in the battery pack.

In some embodiments, the wheel hub gear system comprises an automatic shifting gear system.

In some embodiments, the automatic shifting gear system comprises a 3-speed automatic shifting gear system.

In some embodiments, the wheel hub gear system comprises a manual shifting gear system.

In some embodiments, the wheel hub gear system is partially positioned within the wheel hub.

In some embodiments, the wheel hub gear system comprises at least one gear sprocket arranged to engage a bicycle chain.

In some embodiments, the control unit comprises at least one environmental sensor system.

In some embodiments, the at least one environmental sensor system comprises at least one sensor system selected from the group consisting of: a gas analyzer, a particulate sensor, a temperature sensor, a humidity sensor, and a noise sensor.

In some embodiments, the control unit is configured to collect and store environmental sensor system data.

In some embodiments, the control unit further comprises a telecommunications system unit that can access mobile/cellular data networks.

In some embodiments, the control unit is further configured to transmit environmental sensor system data to one or more internet connected system via the mobile/cellular data networks.

In some embodiments, the control unit comprises a global positioning system unit that can receive location and time data.

In another aspect, a method of fabricating a wheel spoke, comprises: clamping a spoke between a cylindrical roller and a clamping device; and bending the spoke at a mid-point around the cylindrical roller, wherein the resulting bent spoke has an angle between about 20 degrees and about 60 degree, a vertex of the angle being formed at the mid-point of the spoke.

In some embodiments, the cylindrical roller comprises a PVC pipe.

In some embodiments, the cylindrical roller comprises a metal pipe.

In some embodiments, the cylindrical roller comprises solid roller.

In some embodiments, the clamp comprises a screw clamp.

In some embodiments, the clamp comprises an industrial clip.

In some embodiments, the clamp comprises a pair of pliers.

In some embodiments, first and second ends of the spoke are threaded.

In another aspect, a wheel, comprises: a wheel rim; a wheel hub exclusive of a spoke flange; and a plurality of curved wheel spokes, threaded at both ends, connecting the wheel rim to the wheel hub.

In some embodiments, first and second ends of each of the plurality of wheel spokes are connected to the wheel rim, and a curved portion of each of the plurality of wheel spokes interface with curved spoke pockets of the wheel hub.

In some embodiments, the curved spoke pockets are formed in external side surfaces of the wheel hub.

In some embodiments, the curved portion of each of the plurality of wheel spokes is positioned at a mid-point of each of the plurality of wheel spokes.

In some embodiments, an angle of the plurality of wheel spokes ranges between about 20 degrees and about 60 degrees.

In some embodiments, a vertex of the angle is formed at the curved portion of each of the plurality of wheel spokes.

In some embodiments, the angle of the plurality of wheel spokes is about 40 degrees.

In some embodiments, the plurality of wheel spokes comprises a first set of wheel spokes and a second set of wheel spokes.

In some embodiments, first and second ends of the wheel spokes of the first and second sets are connected to the wheel rim, a curved portion of each of the wheel spokes of the first set interface with curved spoke pockets on a first external side surface of the wheel hub, and a curved portion of each of the wheel spokes of the second set interface with curved spoke pockets on a second external side surface of the wheel hub.

In some embodiments, the wheel spokes of the first and second sets are alternately connected around an inner circumference of the wheel rim.

In some embodiments, first and second ends of each of the plurality of wheel spokes are connected to the wheel rim, and a curved portion of each of the plurality of wheel spokes interface with an enclosed channel provided within an outer casing of the wheel hub.

In some embodiments, first and second ends of each of the plurality of wheel spokes are connected to the wheel rim, and a curved portion of each of the plurality of wheel spokes interface with protrusions or hooks extending outward from an outer casing of the wheel hub.

In some embodiments, first and second ends of each of the plurality of wheel spokes are connected to the wheel rim, and a curved portion of each of the plurality of wheel spokes interface with an external claps of the wheel hub.

In some embodiments, the motorized hub unit is connected to the wheel rim via a plurality of wheel spokes.

In some embodiments, the wheel spokes are under one of tension and compression.

In some embodiments, the motorized hub unit is connected to the wheel rim via a mesh material.

In some embodiments, the motorized hub unit is connected to the wheel rim via a disk.

BRIEF DESCRIPTION OF THE DRAWINGS

The foregoing and other objects, features and advantages of embodiments of the present inventive concepts will be apparent from the more particular description of preferred embodiments, as illustrated in the accompanying drawings in which like reference characters refer to the same elements throughout the different views. The drawings are not necessarily to scale, emphasis instead being placed upon illustrating the principles of the preferred embodiments.

DETAILED DESCRIPTION OF EMBODIMENTS

The terminology used herein is for the purpose of describing particular embodiments and is not intended to be limiting of the inventive concepts. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

It will be understood that, although the terms first, second, third etc. may be used herein to describe various limitations, elements, components, regions, layers and/or sections, these limitations, elements, components, regions, layers and/or sections should not be limited by these terms. These terms are only used to distinguish one limitation, element, component, region, layer or section from another limitation, element, component, region, layer or section. Thus, a first limitation, element, component, region, layer or section discussed below could be termed a second limitation, element, component, region, layer or section without departing from the teachings of the present application.

It will be further understood that when an element is referred to as being "on" or "connected" or "coupled" to another element, it can be directly on or above, or connected or coupled to, the other element or intervening elements can be present. In contrast, when an element is referred to as being "directly on" or "directly connected" or "directly coupled" to another element, there are no intervening elements present. Other words used to describe the relationship between elements should be interpreted in a like fashion (e.g., "between" versus "directly between," "adjacent" versus "directly adjacent," etc.). When an element is referred to herein as being "over" another element, it can be over or under the other element, and either directly coupled to the other element, or intervening elements may be present, or the elements may be spaced apart by a void or gap.

Figure 1A:
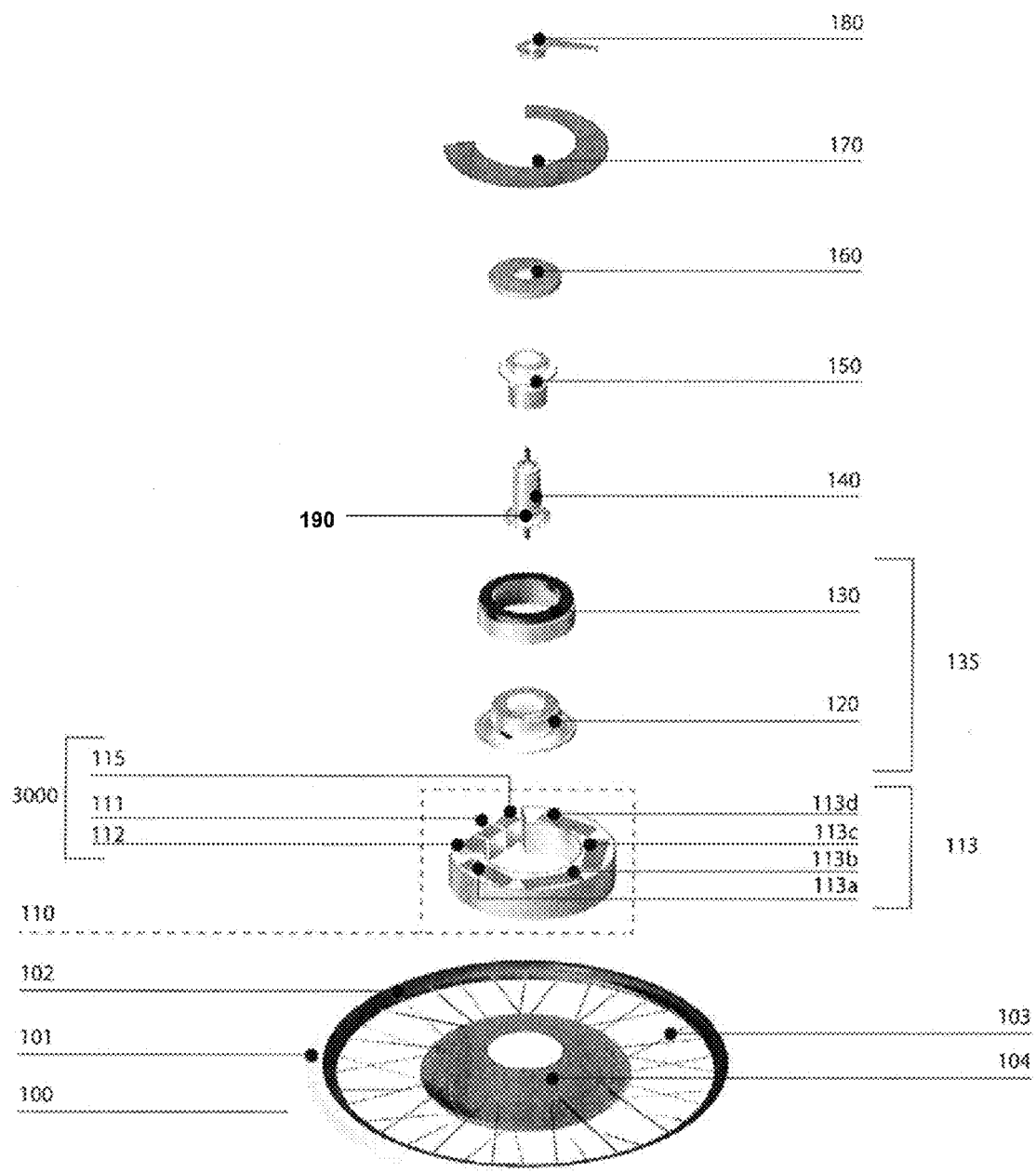
FIG. 1A is an exploded diagram of a hybrid sensor-enabled electric wheel, in accordance with embodiments of the present inventive concepts.
Figure 1B:
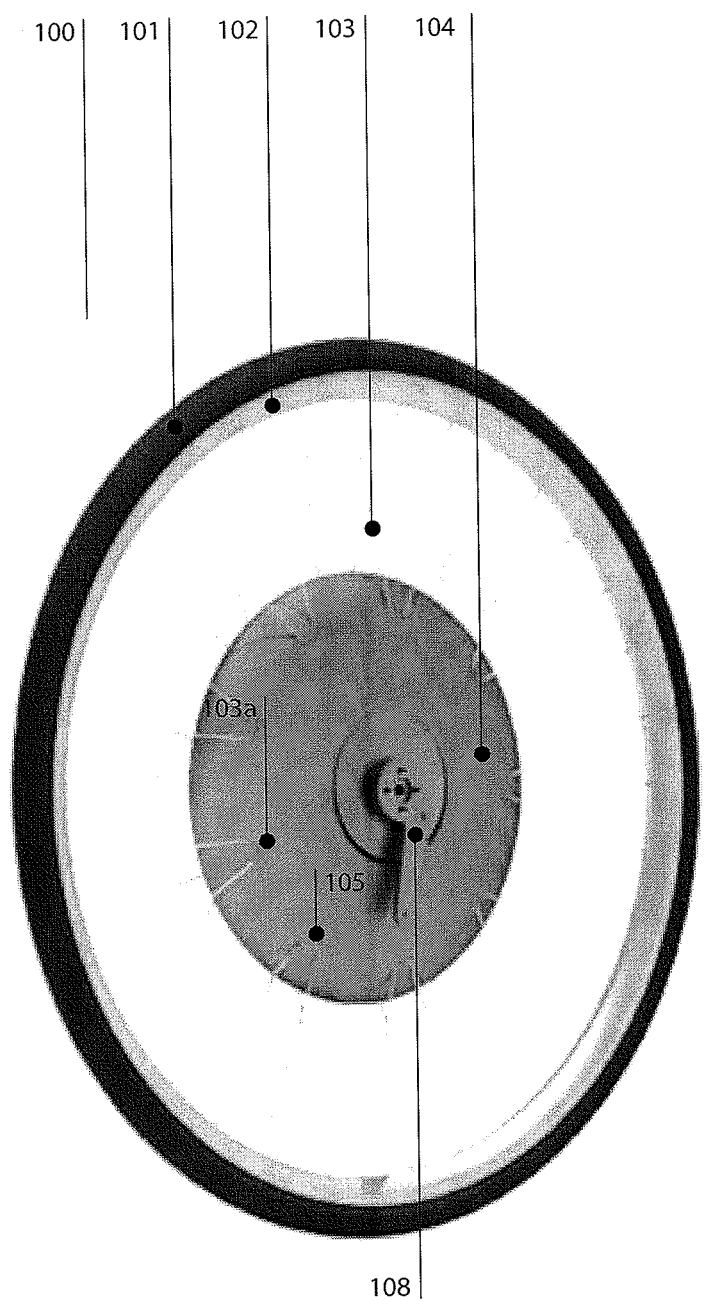
FIG. 1B is a perspective view of a hybrid sensor-enabled electric wheel, in accordance with embodiments of the present inventive concepts.

FIG. 1A is an exploded diagram of a hybrid sensor-enabled electric wheel, and FIG. 1B is a perspective view of a hybrid sensor-enabled electric wheel. The hybrid sensor-enabled electric wheel 100 can comprise a tire 101, a wheel rim 102, a plurality of spokes 103, and a wheel hub 104.

The wheel rim 102 is connected to the wheel hub 104 via the plurality of spokes 103. In this exemplary embodiment, first and second ends of each of the plurality of spokes 103 are connected to the wheel rim 102, and curved portions 103a of each of the plurality of spokes 103 interface with curved spoke pockets 105 of the wheel hub 104. In this manner, the curved portions 103a of the plurality of spokes 103 interface with external side surfaces of the wheel hub 104, thus connecting the wheel rim 102 to the wheel hub 104.

In one embodiment, the motorized hub unit is connected to the wheel rim via a plurality of wheel spokes, and the wheel spokes can be under one of tension and compression. In another embodiment, the motorized hub unit is connected to the wheel rim via a mesh material. In another embodiment, the motorized hub unit is connected to the wheel rim via a disk.

Although not shown, the wheel rim 102 and wheel hub 104 can alternately be connected according to conventional wheel spoking paradigms. For example, first ends of each of a plurality of spokes can be connected to the wheel rim 102, and second ends of each of the plurality of spokes can be connected to the wheel hub 104. Such conventional spoking paradigms are well known in the art, and thus their further detailed description will be omitted.

Referring to FIGS. 1A and 1B, the wheel hub 104 can include a modular systems package 110, a rotor 120, a stator 130, a mechanical drive unit 190 that is coupled to and drives an inner wheel hub gear system 140, a torque sensing system 150, a motor casing 160, an optional removable battery cover 170, an optional coaster brake 180, and a torque arm 186. With the exception of the torque arm 186 and sprocket portions, all mechanical and electrical components of the electric wheel 100 are packaged within the wheel hub 104. The modularity and electromechanical packaging of the hybrid sensor-enabled electric wheel 100 provides a system that can be easily retrofitted into various types of two-wheeled bicycles and wheeled vehicles.

Figure 3A:
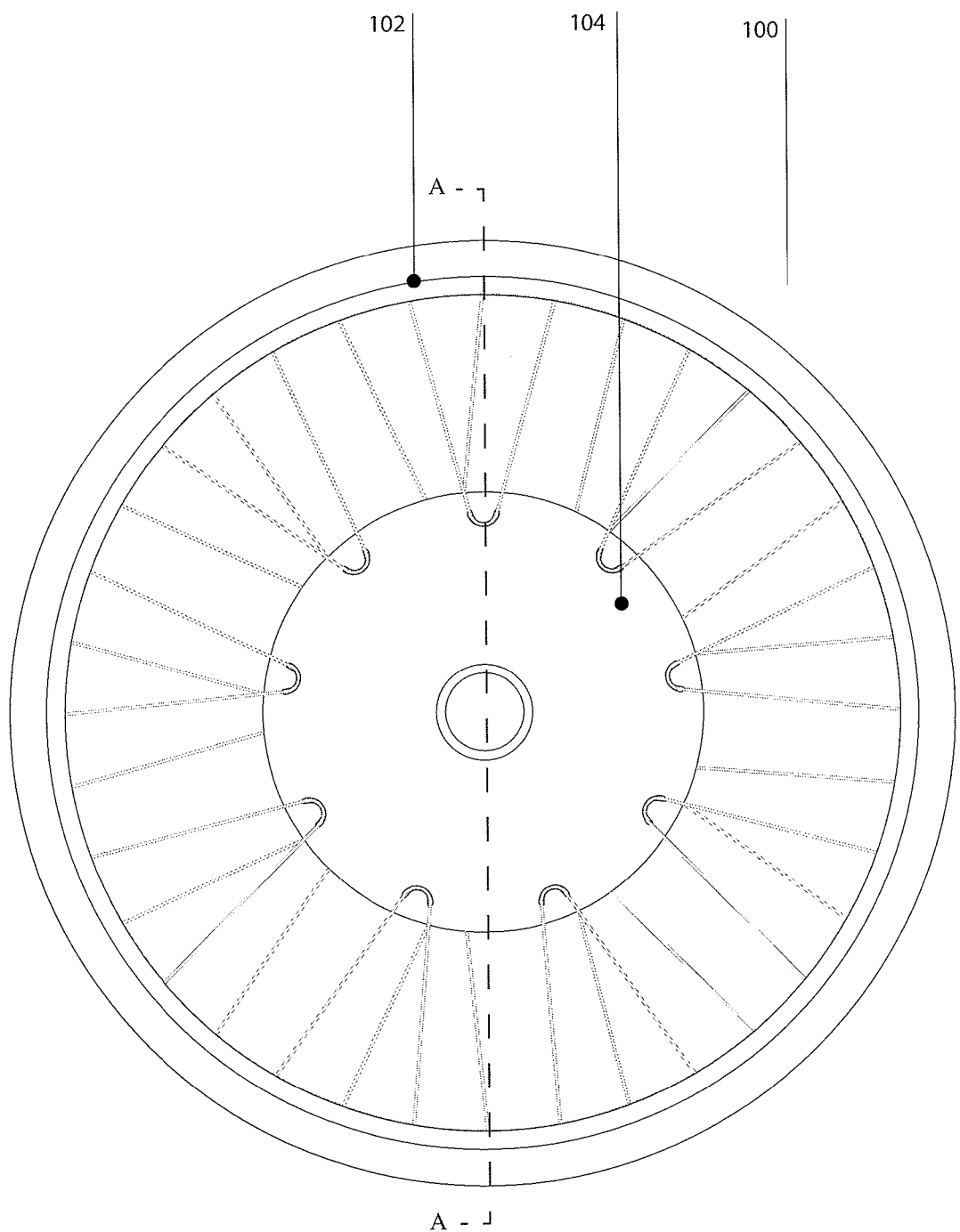
FIG. 3A is plan view of a hybrid sensor-enabled electric wheel, in accordance with embodiments of the present inventive concepts.
Figure 3B:
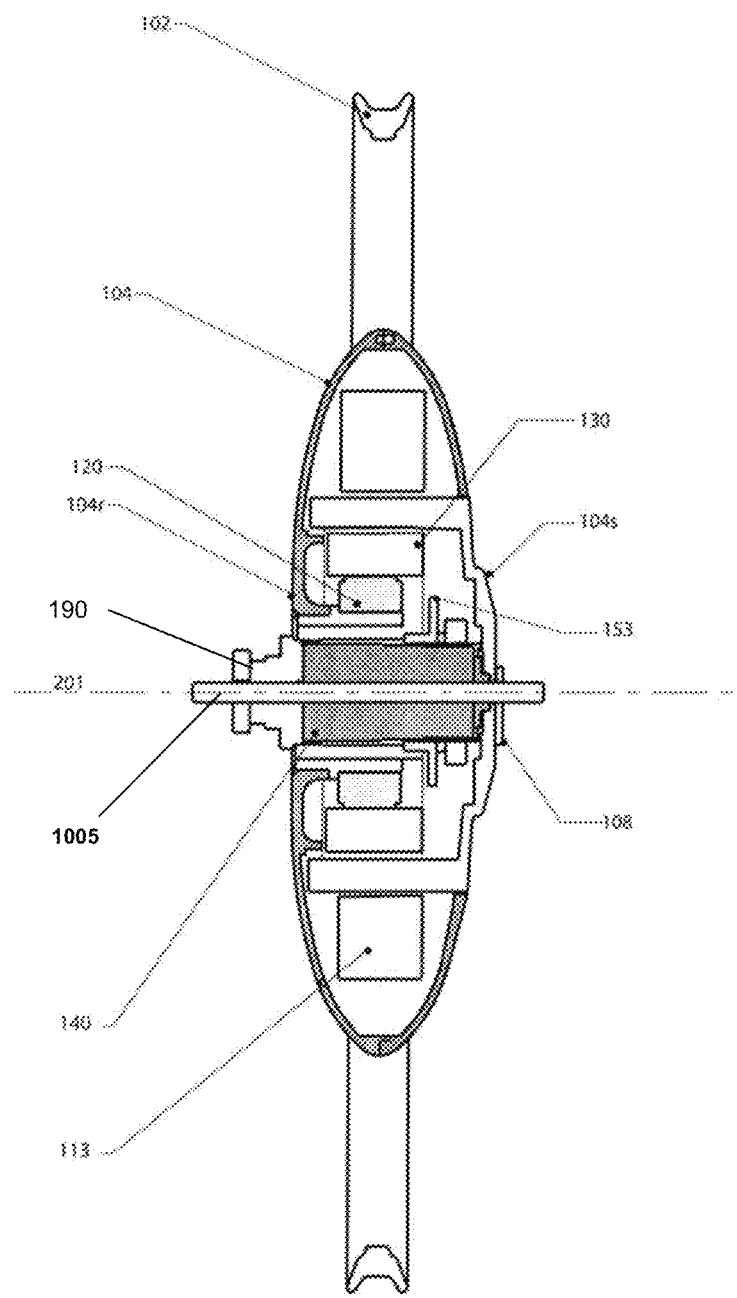
FIG. 3B is a cross-sectional view of the hybrid sensor-enabled electric wheel of FIG. 3A taken along lines A-A', in accordance with embodiments of the present inventive concepts.

Referring to FIG. 3B, the wheel hub 104 can comprise an aluminum hub, and can include a rotating unit 104r and a static unit 104s. The wheel hub 104 can comprise various other materials, such as plastic materials, metal materials and graphite materials in addition to or instead of aluminum. The spokes 103 can be connected to the external side surfaces of the rotating unit 104r, which houses the rotor 120 and inner wheel hub gear system 140. The static unit 104s houses the modular systems package 110, the stator 130 and the torque sensing system 150.

Referring back to FIGS. 1A and 1B, the modular system package 110 can comprise a control unit 3000 including an optional telecommunications and global positioning system unit 111, a motor controller 112 and an optional environmental sensor systems unit 115. The modular system package 110 can further comprise one or more batteries or energy storing devices 113, 113a-d. A removable battery cover 170 of the wheel hub 104 can provide access to the one or more batteries or energy storing devices 113, 113a-d of the modular system package 110. The modular system package 110 is described in further detail below with regard to FIG. 2C.

Together, the rotor 120 and the stator 130 form the motor 135 of the hybrid sensor-enabled electric wheel 100. The motor 135 can comprise, for example, a frameless direct drive rotary motor such as the F and FH Series Frameless DDR Servo Motors by Kollmorgen of Radford, Va., USA, which is now part of the Danaher Corporation of Washington D.C., USA. In one embodiment, the motor 135 comprises a Kollmorgen F4309A-111 frameless motor. However, other types of motors can be integrated within the hybrid sensor-enabled electric wheel 100 without departing from the spirit and scope of the present inventive concepts described herein.

The inner wheel hub gear system 140 can comprise automatic or manual shifting gears. With automatic shifting gears, the gear shifting is controlled based on a combination of a torque applied by the cyclist and motor 135, and velocity of the wheel 100. In one embodiment, the inner wheel hub gear system comprises a Shimano Nexus 3-speed gear system with coaster brake by Shimano of Osaka, Japan. However, other types of inner wheel hub gear systems can be integrated within the hybrid sensor-enabled electric wheel 100 without departing from the spirit and scope of the present inventive concepts described herein.

The wheel hub 104 can further comprise a torque sensing system 150, a motor casing 160 and a coaster brake 180. In some embodiments, mechanical braking occurs through the coaster brake 180 and/or the inner wheel hub gear 140, and is controlled by the amount of negative torque applied to pedals by a cyclist. For example, a cyclist can active mechanical braking by back-pedaling.

In addition to mechanical braking, regenerative braking is available in some embodiments. Regenerative braking can also be activated in response to the back-pedaling of a cyclist. For example, a torque and velocity applied by a back-pedaling cyclist can be measured via the torque sensing system 150. In response to the measured torque and/or velocity, the control unit 3000 of the modular system package 110 can activate regenerative braking.

For example, when a cyclist back-pedals, regenerative braking controlled via the control unit 3000 of the modular system package 110 is activated. That is, the electric motor 135 of the wheel 100, acting as a generator, generates a supplemental negative torque, and the energy generated in response to the supplemental negative torque is transferred and stored in the one or more batteries or energy storing devices 113 of the wheel 100.

In some embodiments, mechanical braking occurring through the coaster brake 180 and/or the inner wheel hub gear 140 is activated when regenerative braking can not provide a sufficient amount of negative torque. That is, as a cyclist applies a greater negative torque (i.e., back-pedals harder), mechanical braking can be activated.

For example, as a cyclist back-pedals harder (i.e., applies a greater negative torque) the mechanical braking is activated in addition to the regenerative braking. However, in some embodiments, regenerative braking is deactivated in response to the activation of mechanical braking.

Figure 2A:
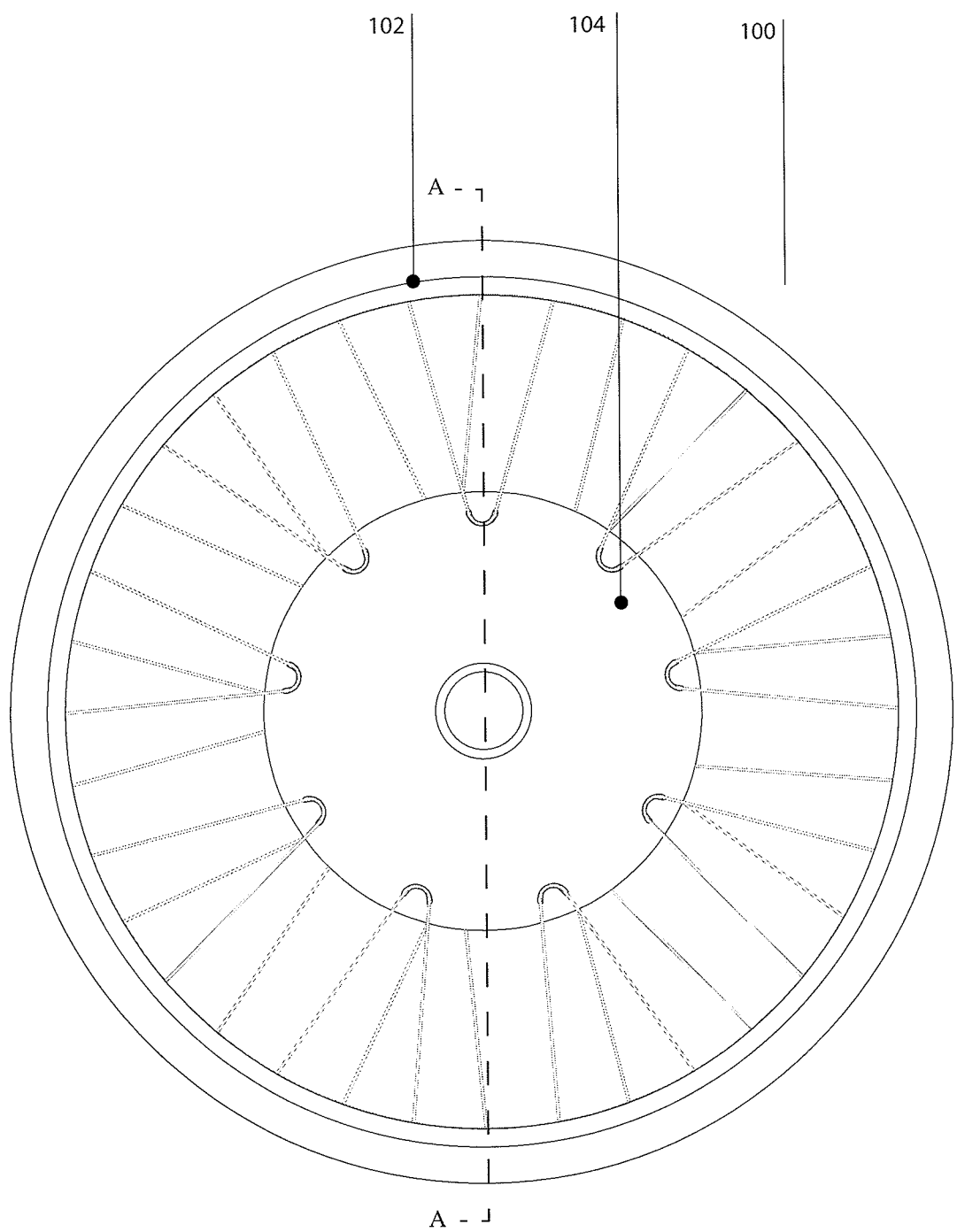
FIGS. 2A-2C are plan and section views of a hybrid sensor-enabled electric wheel, in accordance with embodiments of the present inventive concepts.
Figure 2B:
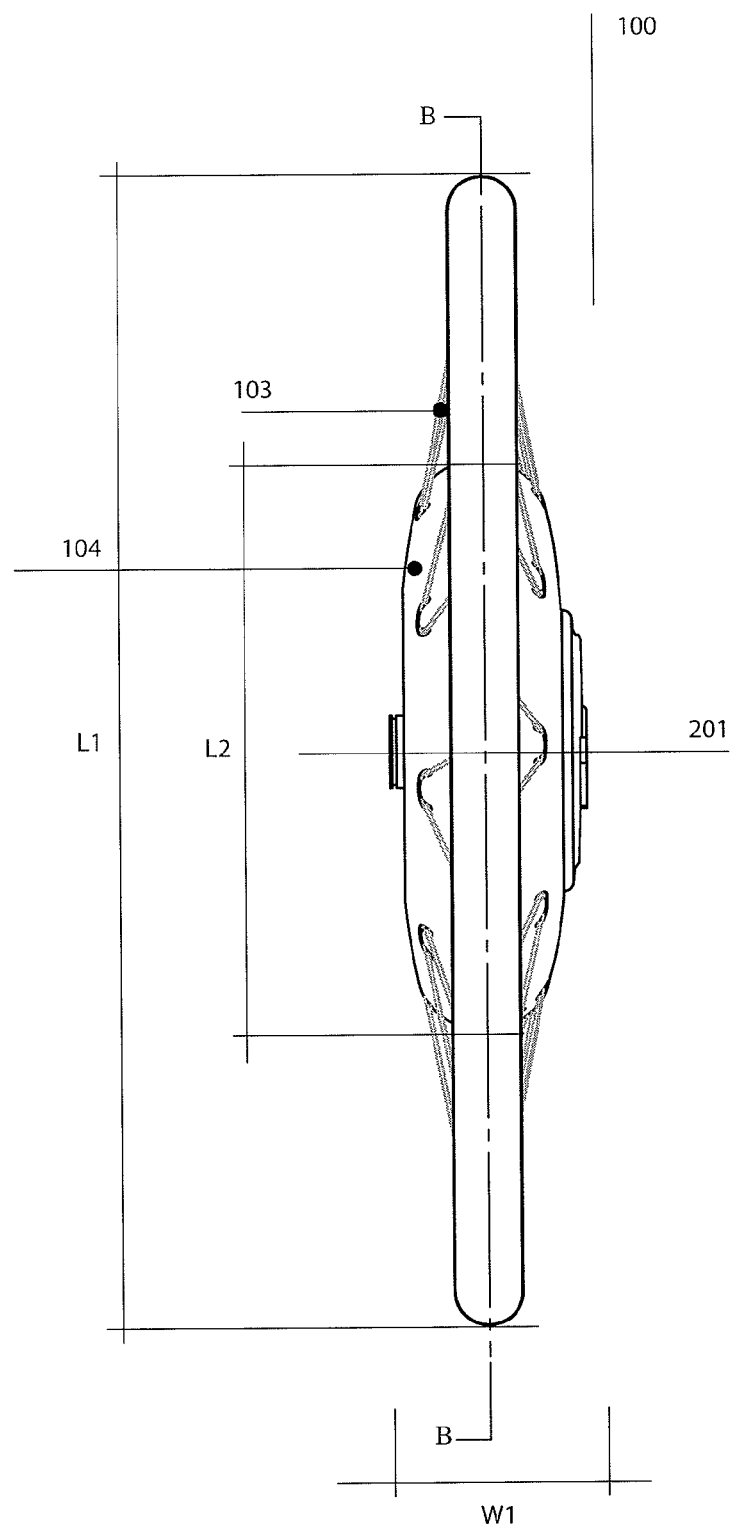
Figure 2C:
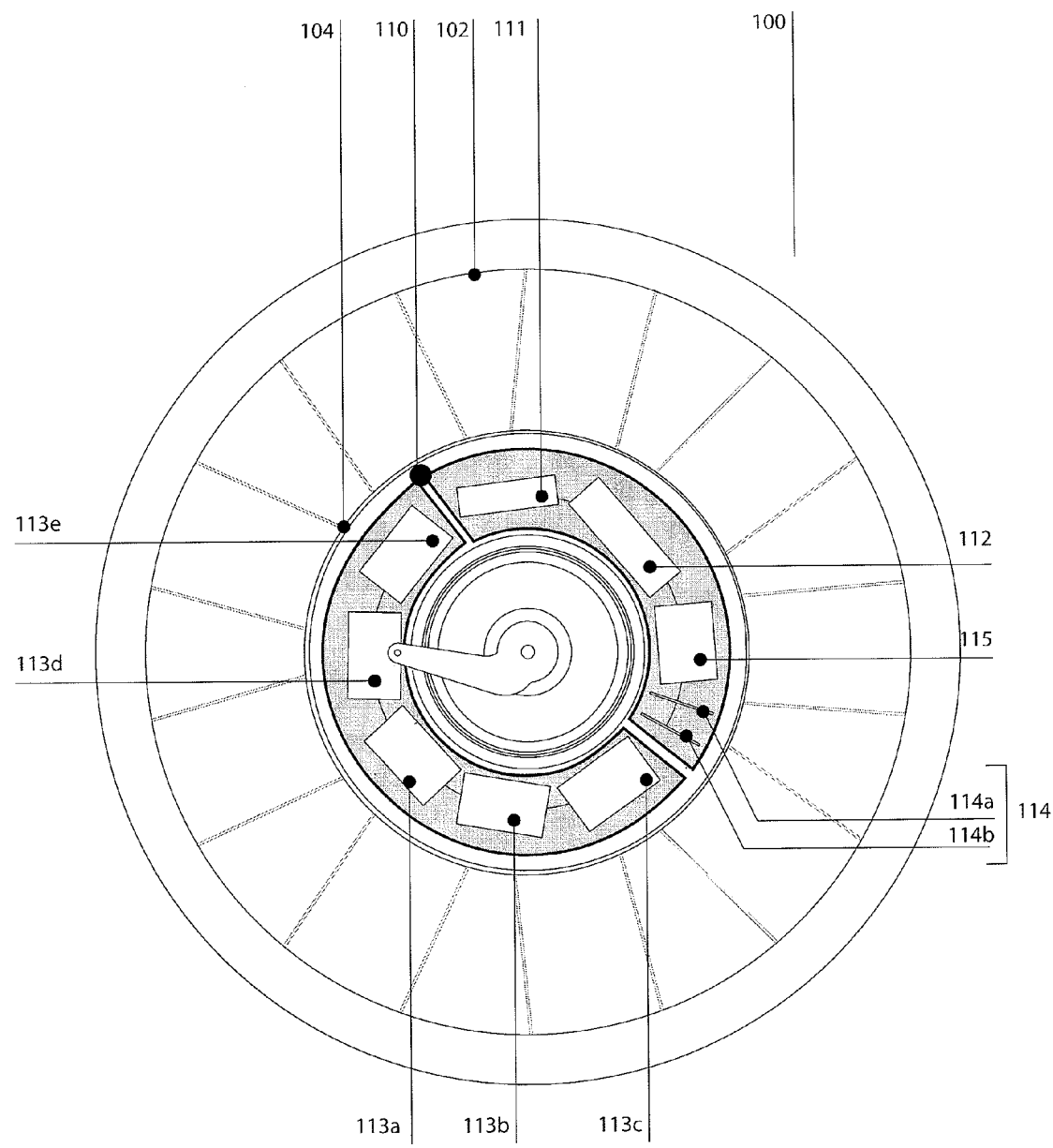

FIGS. 2A-2C are plan and section views of a hybrid sensor-enabled electric wheel. The hybrid sensor-enabled electric wheel 100 can be manufactured in various sizes such that the wheel 100 can be retrofitted into various types of two-wheeled bicycles and other wheeled vehicles.

The hybrid sensor-enabled electric wheel 100 has an overall length (i.e., diameter) L1 along a vertical axis 200, which can range, in some embodiments, between about 200 millimeters and about 724 millimeters. In one embodiment, the length L1 is about 642 millimeters±2 millimeters. The hybrid sensor-enabled electric wheel 100 has an overall width W1 along a horizontal axis 201, which can range, in some embodiments, between about 90 millimeters and about 115 millimeters. In one embodiment, the width W1 is about 115 millimeters±2 millimeters.

The wheel hub 104 of the hybrid sensor-enabled electric wheel 100 has an overall length (i.e., diameter) L2 along the vertical axis 200, which can range, in some embodiments, between about 200 millimeters and about 500 millimeters. In one embodiment, the length L2 is about 314.325 millimeters±2 millimeters.

Referring to FIG. 2C, the wheel hub 104 can comprise the modular systems package 110, which can be packaged within the wheel hub 104 of the hybrid sensor-enabled electric wheel 100. As such, the modular systems package 110 can be protected from external environmental conditions by the outer casing of the wheel hub 104. In some embodiments, a conformal coating material is applied to the modular systems package 110 and/or its components to protect against environmental conditions, such as moisture, dust, dirt and debris.

As described above, the modularity and electromechanical packaging of components and systems within the wheel hub 104 of the hybrid sensor-enabled electric wheel 100 allows for the wheel 100 to be easily retrofitted into various types of two-wheeled bicycles without requiring various types of wiring harnesses, cable ties, and external battery packs secured to a frame of a bicycle.

The modular system package 110 can comprise an optional telecommunications and global positioning system unit 111, a motor controller 112, one or more batteries or energy storing devices 113, 113a-e, one or more control units 114 and an optional environmental sensors system 115.

Figure 8:
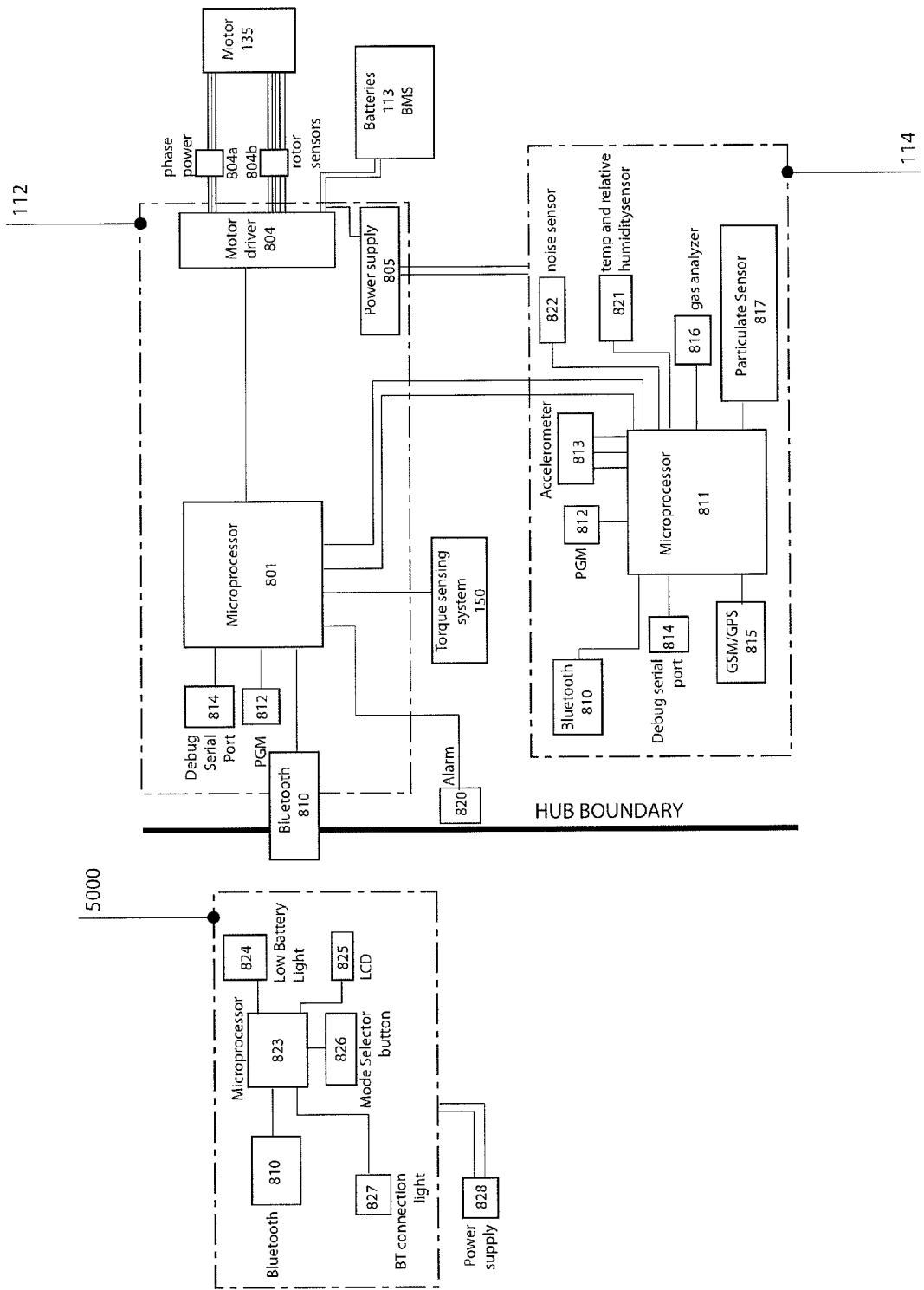
FIG. 8 is a block diagram of a control and sensor system and a motor controller for a hybrid sensor-enabled electric wheel, in accordance with embodiments of the present inventive concepts.

The one or more control units 114 can comprise a microprocessing system that is configured to communicate with and control the motor controller 112 (see for example, unit 811 of FIG. 8). The micro-processing system of the one or more control units 114 can further be configured to communicate with and control the optional telecommunications and global positioning system unit 111.

The telecommunications and global positioning system unit 111 can comprise a global positioning system (GPS) unit or other location positioning technology that can provide location and time data, and a telecommunications system unit that can provide access to mobile/cellular data networks (see for example, unit 815 of FIG. 8). In one embodiment, the telecommunications system unit comprises a general packet radio service (GPRS) unit or other wireless technology that can provide access to 2G and 3G cellular communications systems or other modes of wireless communications. However, the telecommunications system unit can comprise various other types of 2G, 3G and 4G telecommunications systems. In some embodiments, the telecommunications and global positioning system unit 111 is integrated within the one or more control units 114.

The motor controller 112 can comprise a 3-phase brushless DC motor driver that generates 3 phases of drive current based on the rotor 120 position/orientation (see for example, units 804, 804a, 804b of FIG. 8). The motor controller 112 can determine the rotor position/orientation/velocity using hall effect sensors, rotary position sensors, or by measuring the back EMF in undriven coils. In other embodiments, the motor controller 112 can comprise a motor driver associated with the specific type of motor 135 integrated within the wheel 100.

The one or more batteries or energy storing devices 113, 113a-e can comprise one or more rechargeable batteries, one or more bulk capacitors, or a combination thereof. The one or more batteries 113, 113a-e can be configured as a single, removable battery pack.

In one embodiment, the batteries 113 comprise 18 Superior Lithium Polymer Batteries (SLPB 486495) by Kokam Engineering Co., LTD of Gyeonggi-do, Republic of Korea. In this embodiment, each of the 18 Superior Lithium Polymer Batteries (SLPB 486495) has a nominal voltage of 3.7 volts and a capacity of 3 amp-hours; the battery system is configured to have a voltage of 22.2 volts and a capacity of 9 amp-hours, and weighs about 1.062 kilograms. As such, the battery system is configured with 3 parallel-connected sets of 6 series-connected batteries. In some embodiments, the batteries are stationary within the wheel hub 104.

The environmental sensors system 115 can comprise a gas analyzer capable of measuring at least one of CO, $CO_2$, NOx, $O_2$ and $O_3$ content and/or particulate sensor for measuring large and small air particulates. The environmental sensors 115 can comprise a temperature and humidity sensor for measuring ambient temperature and relative humidity. The environmental sensors 115 can comprise a noise sensor for measuring environmental noise pollution.

FIG. 3A is plan view of a hybrid sensor-enabled electric wheel, and FIG. 3B is a cross-sectional view of the hybrid sensor-enabled electric wheel of FIG. 3A taken along lines A-A'.

As described above, the wheel hub 104 can include a rotating unit 104r and a static unit 104s. The spokes 103 can be connected to the external side surfaces of the rotating unit 104r, which houses the rotor 120 and inner wheel hub gear system 140. The static unit 104s houses the modular systems package 110, the stator 130 and the torque sensing system 150.

In this illustrative example, the batteries 113 are positioned concentrically within the wheel hub 104 with respect to the horizontal axis 201. As such, the batteries 113 are positioned within the wheel hub 105 so as to reduce the bulk of the wheel hub casing.

Figure 4A:
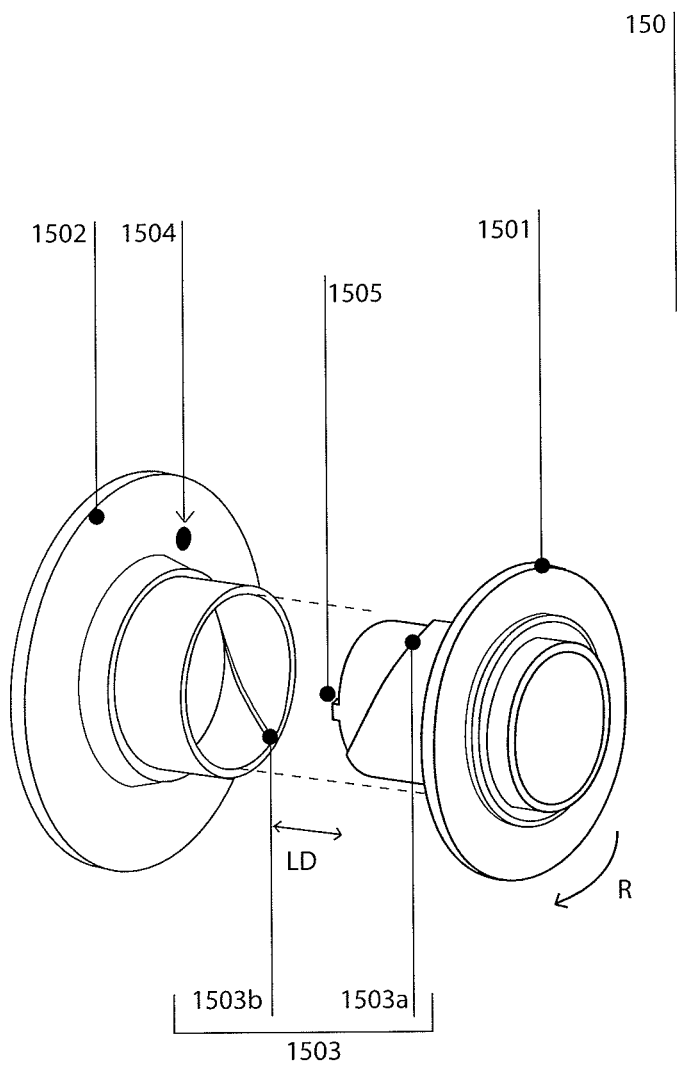
FIG. 4A is a perspective view of a torque sensing system for hybrid sensor-enabled electric wheels, in accordance with embodiments of the present inventive concepts.

FIG. 4A is a perspective view of a torque sensing system for hybrid sensor-enabled electric wheels. The torque sensing system 150 can comprise an inner sleeve 1501, an outer sleeve 1502 and a proximity sensor 1504. The inner and outer sleeves 1501, 1502 comprise opposing ramps 1503, 1503a-b, which can affect a lateral displacement LD between the inner sleeve 1501 and the outer sleeve 1502.

For example, when a torque is applied to one of the inner and outer sleeves 1501, 1502, the inner sleeve 1501 can rotate R in a clockwise or counterclockwise direction with respect to the outer sleeve 1502. The rotation R of the inner sleeve 1501 causes the ramp 1503a of the inner sleeve 1501 to ride up or down the ramp 1503*b* of the outer sleeve 1502. Accordingly, the rotation R of the inner sleeve 1501 can affect the lateral displacement LD between the inner sleeve 1501 and the outer sleeve 1502. That is, as the ramp 1503*a* of the inner sleeve 1501 rides up the ramp 1503*b* of the outer sleeve 1502, the lateral displacement LD between the inner and outer sleeves 1501, 1502 increases, and as the ramp 1503*a* of the inner sleeve 1501 rides down the ramp 1503*b* of the outer sleeve 1502, the lateral displacement LD between the inner and outer sleeves 1501, 1502 decreases.

A proximity sensor 1504 can be provided on the inner or outer sleeve 1501, 1502 so that the lateral displacement LD between the inner and outer sleeve 1501, 1502 can be measured. A proximity sensor 1504 is shown provided on a surface of the outer sleeve 1502.

The inner sleeve 1501 can be provided with a notch 1505 that can interface with a spring/elastomer mechanism 1510 (shown and described below in detail in connection with FIG. 4D). The spring/elastomer mechanism 1510 applies a known force (i.e., by way of a known spring constant) on the inner sleeve 1501 via the notch 1505 of the inner sleeve 1501.

Accordingly, a torque applied to one of the inner and outer sleeves 1501, 1502 can be calculated from a combination of a measured lateral displacement LD and a known force applied to the notch of the inner sleeve 1501.

Figure 4B:
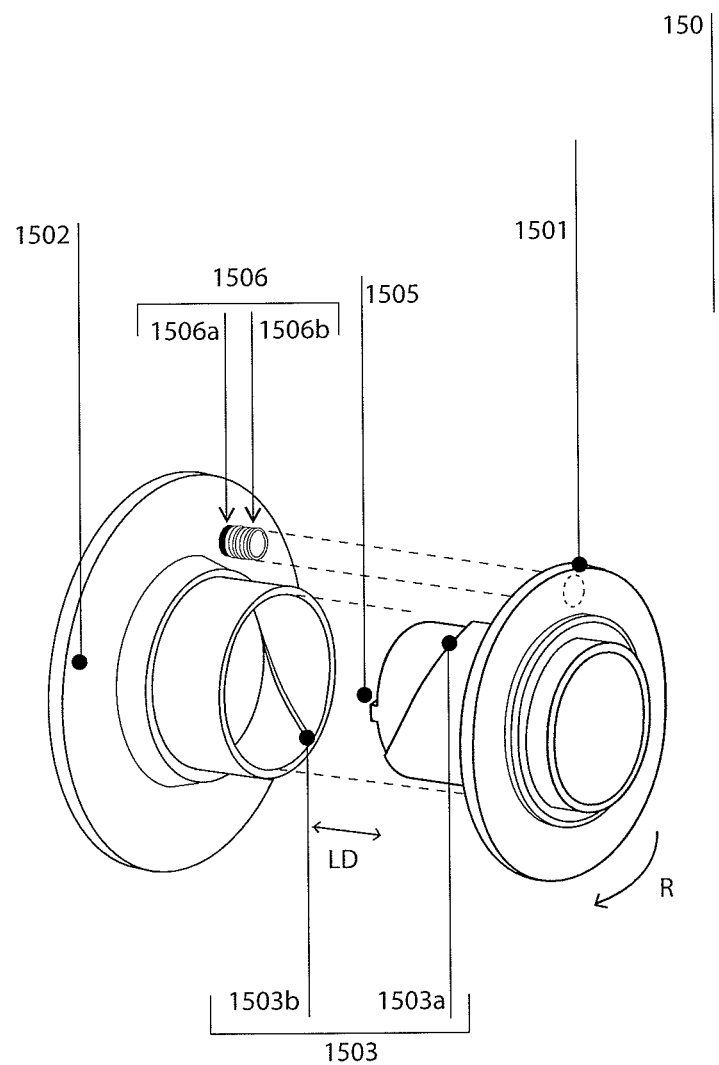
FIG. 4B is a perspective view of a torque sensing system for hybrid sensor-enabled electric wheels, in accordance with embodiments of the present inventive concepts.

FIG. 4B is a perspective view of a torque sensing system for hybrid sensor-enabled electric wheels. Elements having the same functions as those described above are indicated by like reference identifiers, and thus their detailed description will not be repeated.

The torque sensing system 150 illustrated in FIG. 4B operates in a similar manner as the torque sensing system 150 illustrated in FIG. 4A; however, the proximity sensor 1504 of the torque sensing system 150 illustrated in FIG. 4A is replaced with a displacement sensor 1506 comprising a spring/elastomer 1506*a* and pressure sensor 1506*b*, or other technologies for measuring distance such as resistive, capacitive, or other types of distance measurement technologies.

Figure 4C:
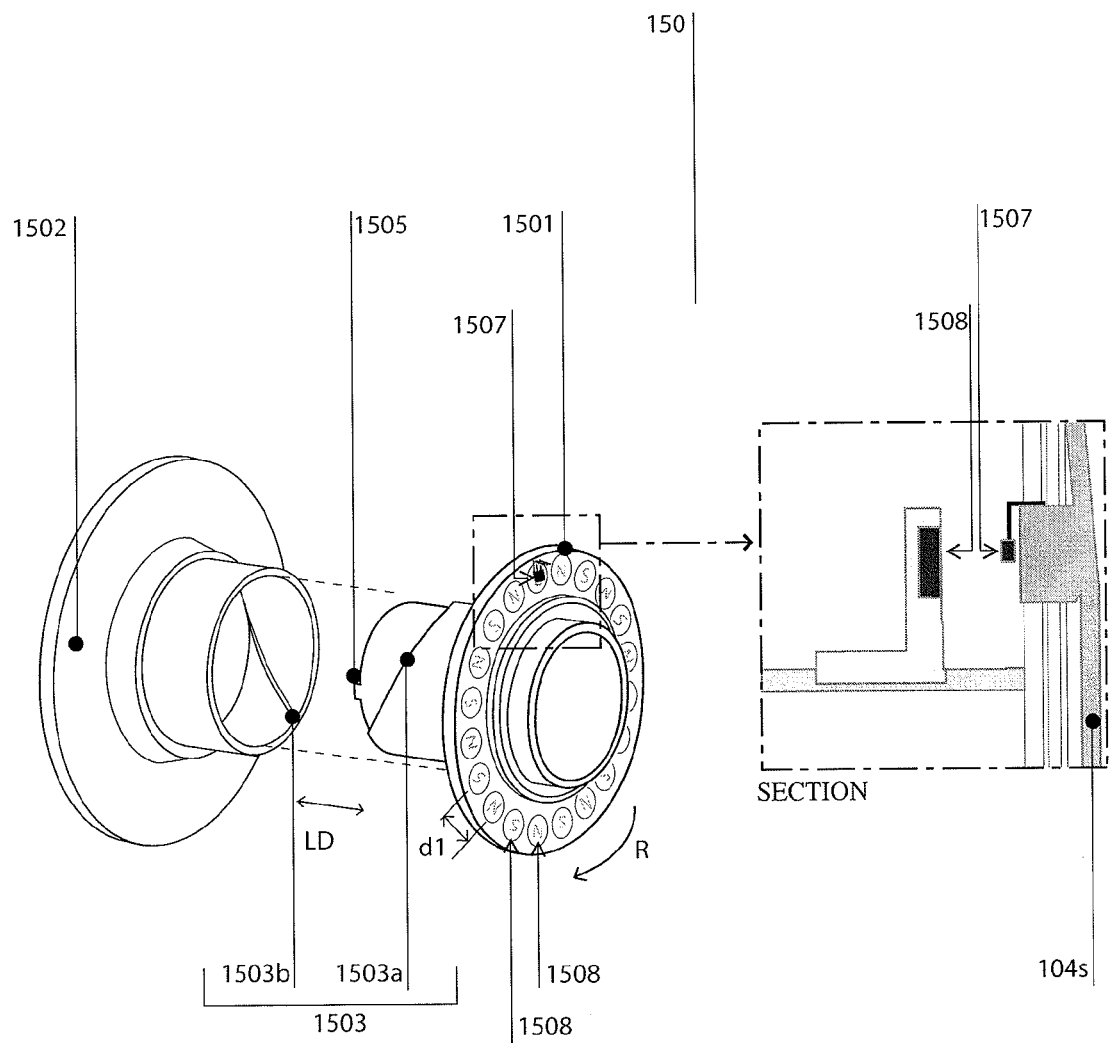
FIG. 4C is a perspective view of a torque sensing system for hybrid sensor-enabled electric wheels, in accordance with embodiments of the present inventive concepts.

FIG. 4C is a perspective view of a torque sensing system for hybrid sensor-enabled electric wheels. Elements having the same functions as those described above are indicated by like reference identifiers, and thus their detailed description will not be repeated.

The torque sensing systems 150 described throughout the application can further comprise a velocity sensing system including one or more hall effect sensors 1507 and a plurality of magnets 1508. In one embodiment, the magnets 1508 are provided in an alternating configuration on an outer surface of the inner sleeve 1501, and spaced apart by a predetermined distance d1. That is, the magnets 1508 provided on the outer surface of the inner sleeve alternate magnetic poles (e.g., N-S-N-S-N-S). In this manner, a velocity measurement can be calculated based on a time-distance relationship.

Figure 4D:
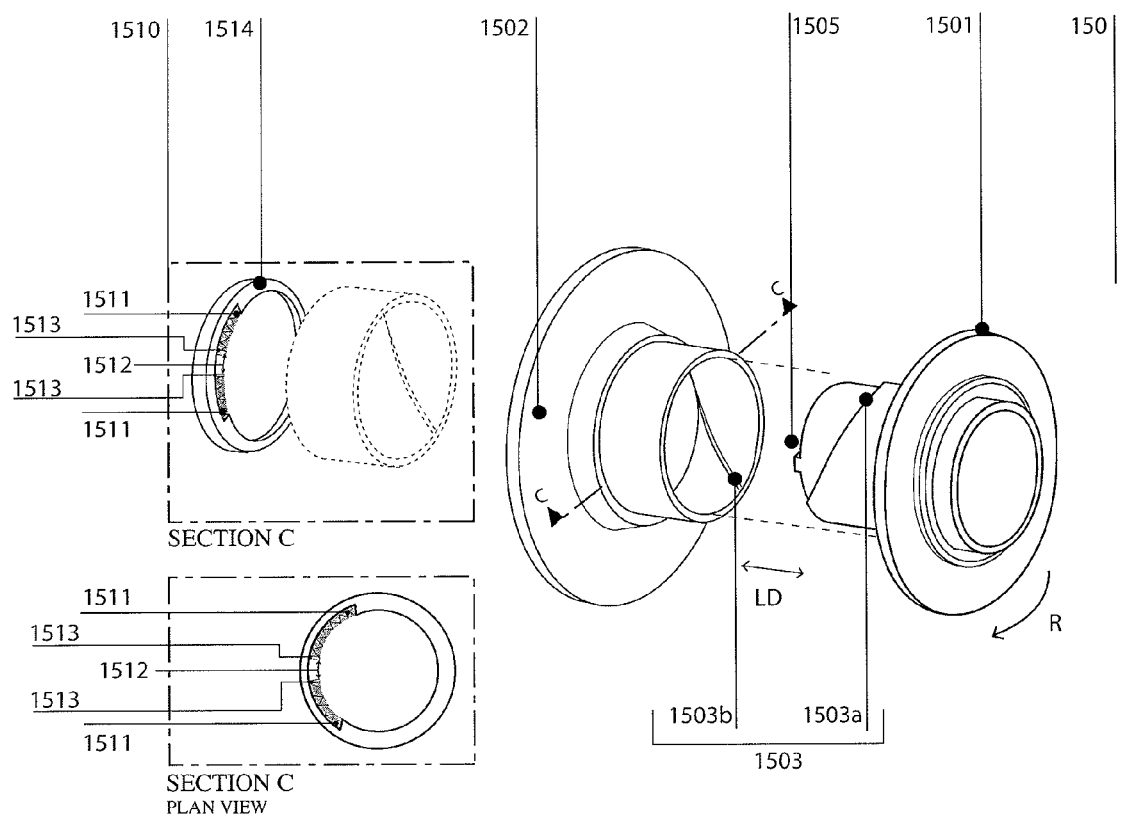
FIG. 4D illustrates several views of a spring/elastomer mechanism of a torque sensing system for hybrid sensor-enabled electric wheels, in accordance with embodiments of the present inventive concepts.

FIG. 4D illustrates several views of a spring/elastomer mechanism of a torque sensing system for hybrid sensor-enabled electric wheels. Elements having the same functions as those described above are indicated by like reference identifiers, and thus their detailed description will not be repeated.

A spring/elastomer mechanism 1510 of a torque sensing system 150 can comprise first and second springs/elastomers 1511 and optional pressure sensors 1513. The first and springs/elastomers 1511 are provided in a cylindrical housing 1514 of the outer sleeve 1502, and are configured to provide a gap region 1512 so that the notch of 1505 of the inner sleeve 1501 can provided in the gap region 1512. As described above, the spring/elastomer mechanism 1510 can apply a known force (i.e., by way of a known spring constant) on the inner sleeve 1501 via the notch 1505.

Referring to FIGS. 1-4D, the hybrid sensor-enabled and autonomous electric wheel 100 can be fully controlled via bicycle pedals by sensing a torque that is applied by a cyclist. For example, when a cyclist applies a positive torque to the inner wheel hub gear system 140 via bicycle pedals, the hybrid sensor-enabled and autonomous electric wheel 100 supplements the positive torque applied by the cyclist by a predetermined amount. That is, for example, the electric motor 135 of the wheel 100 provides a predetermined amount of positive torque. In another example, when a cyclist applies negative torque (e.g., activates a pedal brake, back-pedals) the hybrid sensor-enabled and autonomous electric wheel 100 supplements the negative torque applied by the cyclist. That is, for example, the electric motor 135 of the wheel 100 generates a supplemental negative torque. In some embodiments, the energy generated by the supplemental negative torque is transferred and/or stored in one or more batteries or energy storing devices 113 of the wheel 100.

Figure 10A:
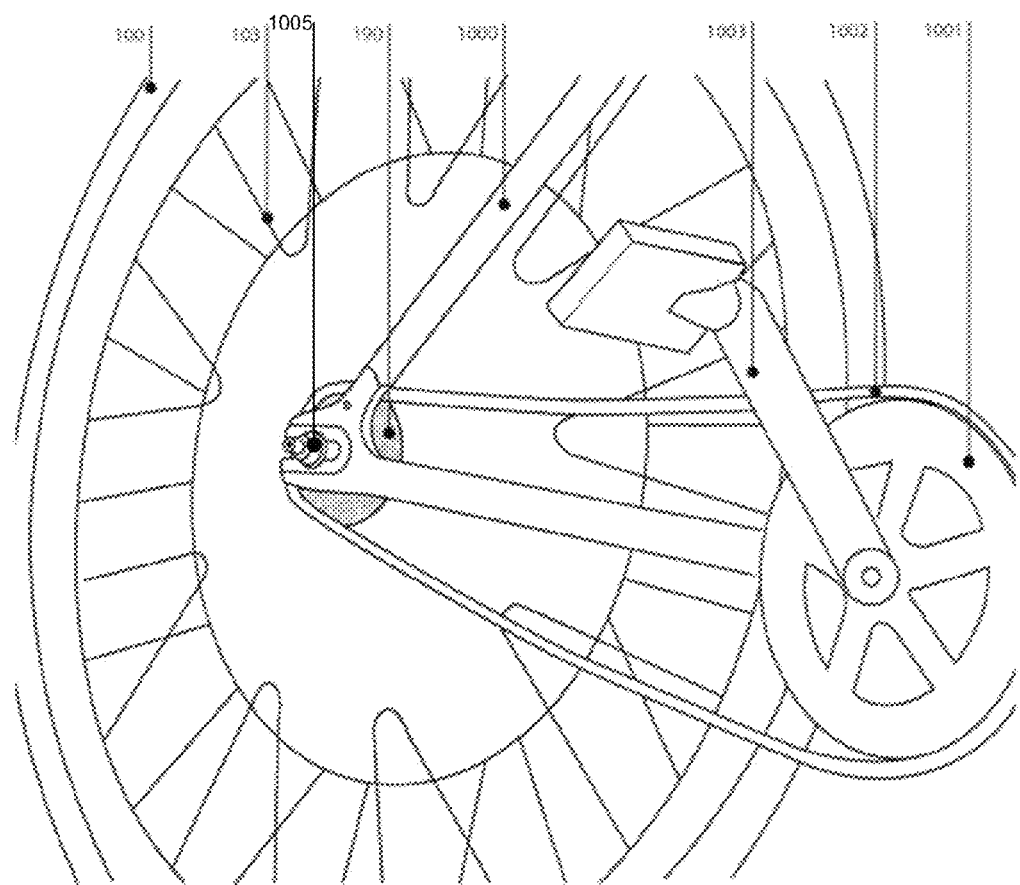
FIGS. 10A-10C are illustrations of a hybrid sensor-enabled electric wheel installed on a bicycle, in accordance with embodiments of the present inventive concepts.
Figure 10B:
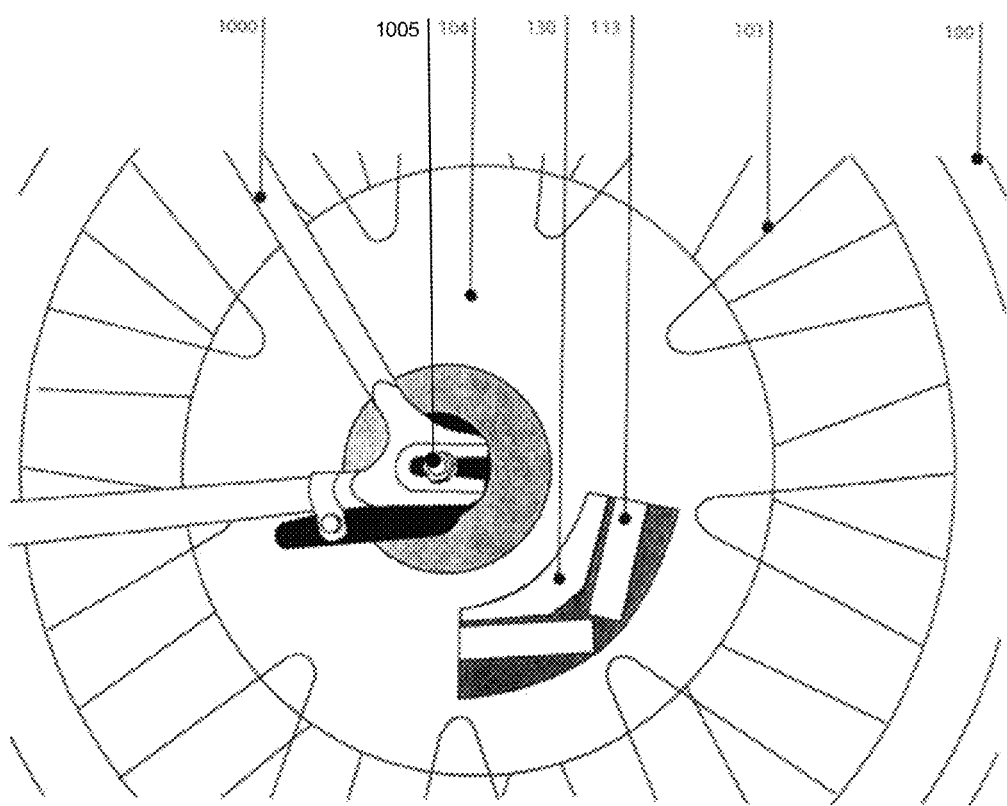
Figure 10C:
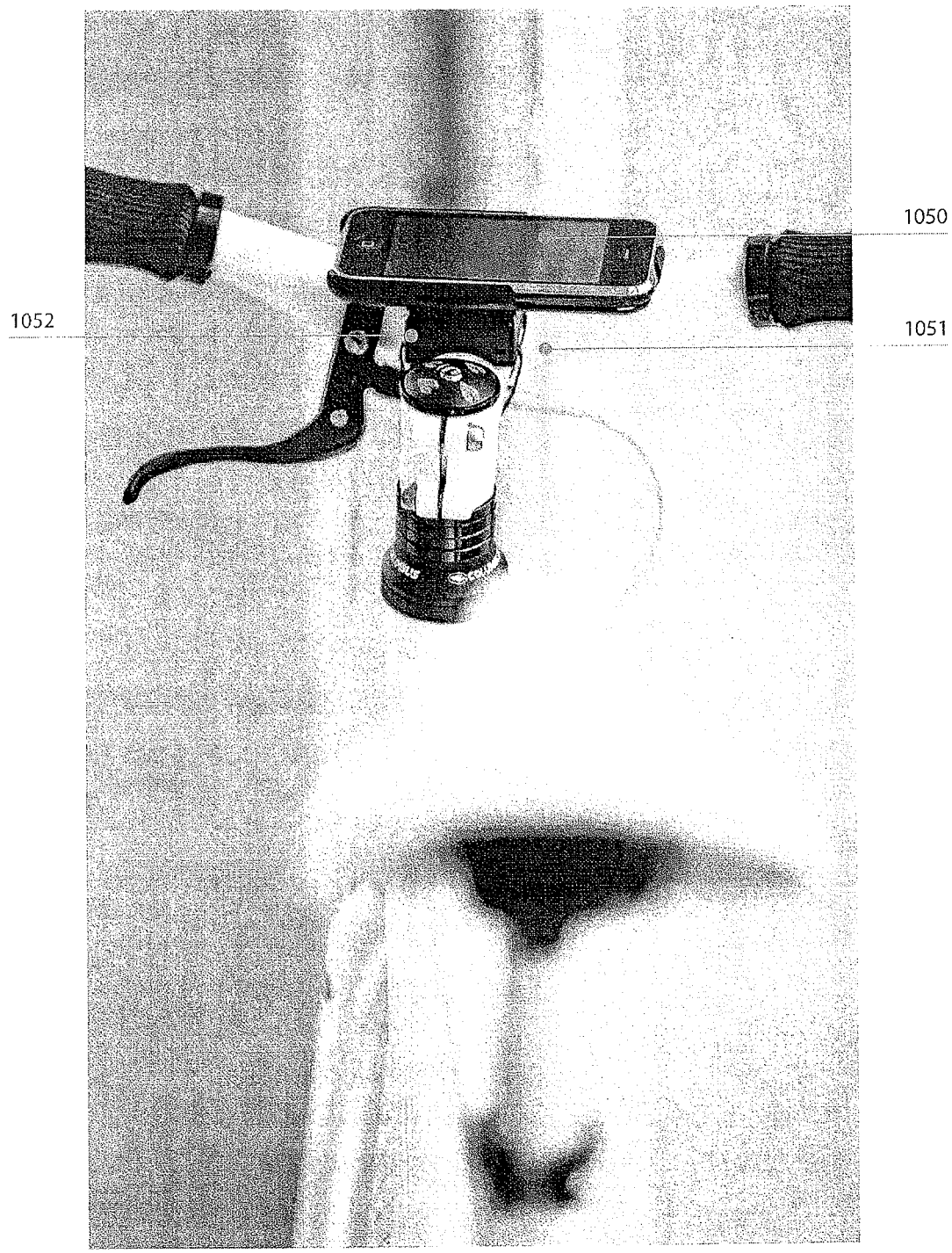

In some embodiments, a smartphone, such as the smartphone illustrated in FIG. 10C, can be configured to communicate with the motor controller 112 or the one or more control units 114 of the hybrid sensor-enabled and autonomous electric wheel 100 via Bluetooth, or other wireless protocol. The smartphone can be configured to access, receive and display various types of data collected by sensors of the wheel, and can configure the data collection processes. For example, the smartphone can configure the one or more control units 114 and sensor systems of the wheel 100 to collect various types of environmental and location data.

The smartphone can also be configured to control operational modes of the hybrid sensor-enabled and autonomous electric wheel 100. For example, a cyclist can configure the wheel 100, via the smartphone, to operate in an energy regeneration mode or exercise mode such that an electric motor 135 of the wheel 100 generates and transfers electrical energy to the one or more batteries or energy storing devices 113 of the wheel 100 while the cyclist is pedaling.

Although a smartphone is described above, various other types of wireless electronic devices such as tablet computers, netbooks and laptops or other wireless control units can be configured to communicate with the motor controller 112 or the one or more control units 114 or 115 of the hybrid sensor-enabled and autonomous electric wheel 100. In another embodiment, a cable connected lever, such as a hand operated handle bar lever, can be connected to the motor controller 112 so as to control one of a drive torque or braking torque of the motor.

In one embodiment, a toque sensing system also comprises a circular pressure sensor or a plurality of point-like pressure sensors placed between the sprocket and the shaft that runs across the hub, covering the area of contact between the sprocket and the shaft. Pressure measurements sample the linear force applied horizontally, in the direction of movement, which is converted to a measure of toque.

In one embodiment, a toque sensing system also comprises a linear tension sensor placed lengthwise inside the shaft that runs across the hub to measure the bending of the shaft which occurs while torque is applied on the sprocket. Tension measurements sample a fraction of the linear force applied horizontally, in the direction of movement, which is converted to a measure of toque. A capacitive as well as resistive sensor can be used for acquiring the same measurement and placed inside the shaft.

Figure 5:
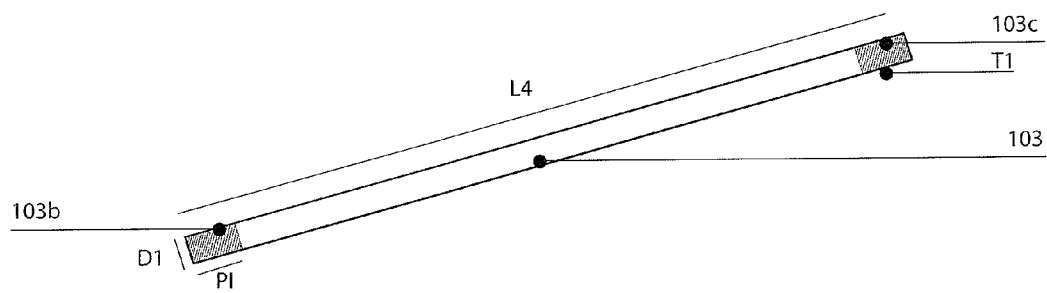
FIG. 5 is perspective view of a wheel spoke, in accordance with embodiments of the present inventive concepts.

FIG. 5 is a perspective view of a wheel spoke.

As described above with reference to FIG. 1A, the wheel rim 102 is connected to the wheel hub 104 via a plurality of spokes 103. First and second ends 103b, 103c of each of the plurality of spokes 103 are connected to the wheel rim 102, and curved portions 103a of each of the plurality of spokes 103 interface with curved spoke pockets 105 of the wheel hub 104. In this manner, the curved portions 103a of the plurality of spokes 103 interface with external surfaces of the wheel hub 104, thus connecting the wheel rim 102 to the wheel hub 104. The rim can also connect to the hub by a plurality of linear spokes that interface with the surface of the hub either through a hole or by a hook, rather than a standard flange.

Referring to FIG. 5, the spokes 103 have a length L4, which can range, in some embodiments, between about 100 millimeters and about 600 millimeters. In one embodiment, the length L4 is about 341 millimeters±2 millimeters. The spokes 103 have a diameter D1, which can range, in some embodiments, between about 1 millimeters and about 5 millimeters. In one embodiment, the diameter D1 is about 2 millimeters±0.25 millimeters.

In some embodiments, first and second ends 103b, 103c of the spokes 103 can be threaded. The threaded portion of the spokes 103 can have a pitch P1, which can range, in some embodiments, between about 0.25 millimeters and about 0.45 millimeters. In one embodiment, the pitch P1 is about 0.45 millimeters±0.2 millimeters. In addition, the threaded portion of the spokes can have a threads per inch (tpi) count T1, which can range, between about 22 tpi and about 62 tpi. In one embodiment, the tpi count can be about 56 tpi±5 tpi. In some embodiments, the tpi count can be a standard nipple thread count associated with bicycle rims or other wheeled vehicles.

Generally, the spoke count 'n', length L4, diameter D1, pitch P1 and tpi count T1 is determined by the size of the wheel 100 and its application. In one embodiment, the wheel rim 102 is connected to the wheel hub 104 via 18 bent wire spokes 103 (see for example FIG. 7). However, in other embodiments the number of bent wire spokes 103 can range between about 12 and about 20. In some embodiments, the wheel rim 102 comprises a 700c wheel rim, and the 18 bent wire spokes 103 are threaded into 36 nipples on the wheel rim 102. However, the spoking concept described herein with reference to at least FIGS. 5, 6A-6C and 7 can be adapted and modified for any size wheel rim 102 by a skilled artisan after a full and complete disclosure of the present application.

Figure 6A:
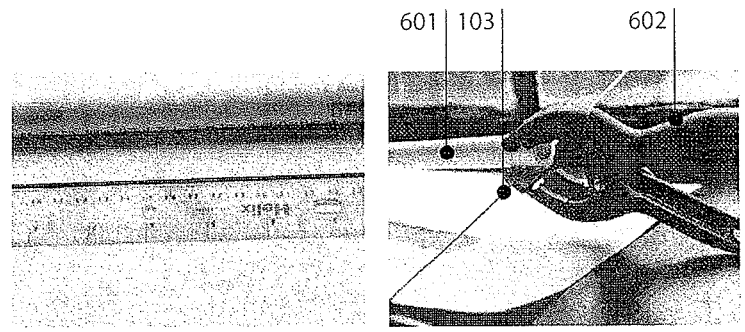
FIGS. 6A-6C illustrate a method of manufacturing a wheel spoke, in accordance with embodiments of the present inventive concepts.
Figure 6B:
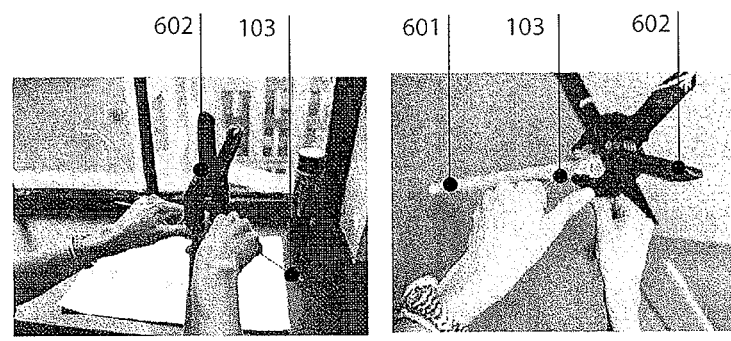
Figure 6C:
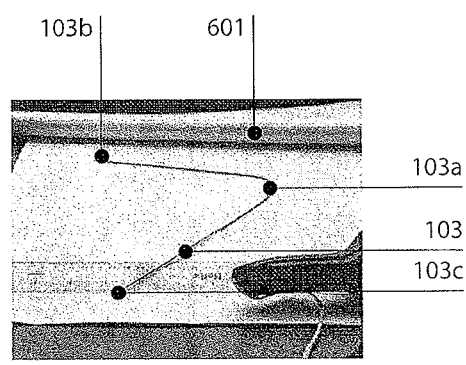

FIGS. 6A-6C illustrate a method of manufacturing a wheel spoke. Although FIGS. 6A-6C disclose a manual method of manufacturing bent wire spokes 103, one skilled in the art would readily understand that the bent wire spokes 103 described herein can be manufactured according to automated processes after a full and complete disclosure of the present application.

Referring to FIG. 6A, a spoke 103 is clamped between a cylindrical roller 601 and a clamping device 602. The cylindrical roller 601 can comprise a pipe, such as a PVC or metal pipe, or a solid roller. The clamping device 602 can comprise a screw clamp, industrial clip, or pliers.

Referring to FIG. 6B, the spokes are bent at a mid-point MP to create a curvature corresponding to the outer curvature of the cylindrical roller 601. In one embodiment, the spokes are bent at the mid-point MP with a curvature ranging between about 15 millimeters to about 20 millimeters.

Referring to FIG. 6C, the resulting bent wire spoke can have a final angle Θ, which can range, in some embodiments, between about 20 degrees and about 60 degrees. This spoking mechanism removes the need for a flange on the hub, allows a seamless connection between the spoke and the exterior of the hub and provides a faster spoking method when attaching or removing the hub to or from the wheel. In one embodiment, the final angle Θ is about 40 degrees±5 degrees.

In addition to the above method of manufacturing wheel spokes, the wheel spokes 103 described herein can be manufactured according to various other methods, such as forming and forging methods, molding methods and injection methods.

FIGS. 7A-7E illustrate wheel spoke configurations. The illustrated wheel spoke configuration comprises a first set of bent wire wheel spokes 103 (e.g., 1a, 2a, 3a, 4a, 5a, 6a, 7a, 8a, 9a) and a second set of bent wire wheel spokes 103 (e.g., 1b, 2b, 3b, 4b, 5b, 6b, 7b, 8b, 9b) that alternately interface with first and second sides 104a, 104b of wheel hub 104. That is, curved portions 103a of each of the bent wire wheel spokes 103 of the first set (e.g., 1a, 2a, 3a, 4a, 5a, 6a, 7a, 8a, 9a) interface with corresponding curved pockets 2000 on the first side 104a of the wheel hub 104, and curved portions 103a of each of the bent wire wheel spokes 103 of the second set (e.g., 1b, 2b, 3b, 4b, 5b, 6b, 7b, 8b, 9b) interface with corresponding curved pockets 2000 on the second side 104b of the wheel hub 104. Further, in this illustrated configuration, the bent wire wheel spokes 103 are alternately arranged around the inner circumference of the wheel rim 102 such that bent wire wheel spokes 103 of the first and second sets alternate (e.g., 1a, 1b, 2a, 2b, 3a, 3b, 4a, 4b, 5a, 5b, 6a, 6b, 7a, 7b, 8a, 8b, 9a, 9b).

Figure 7A:
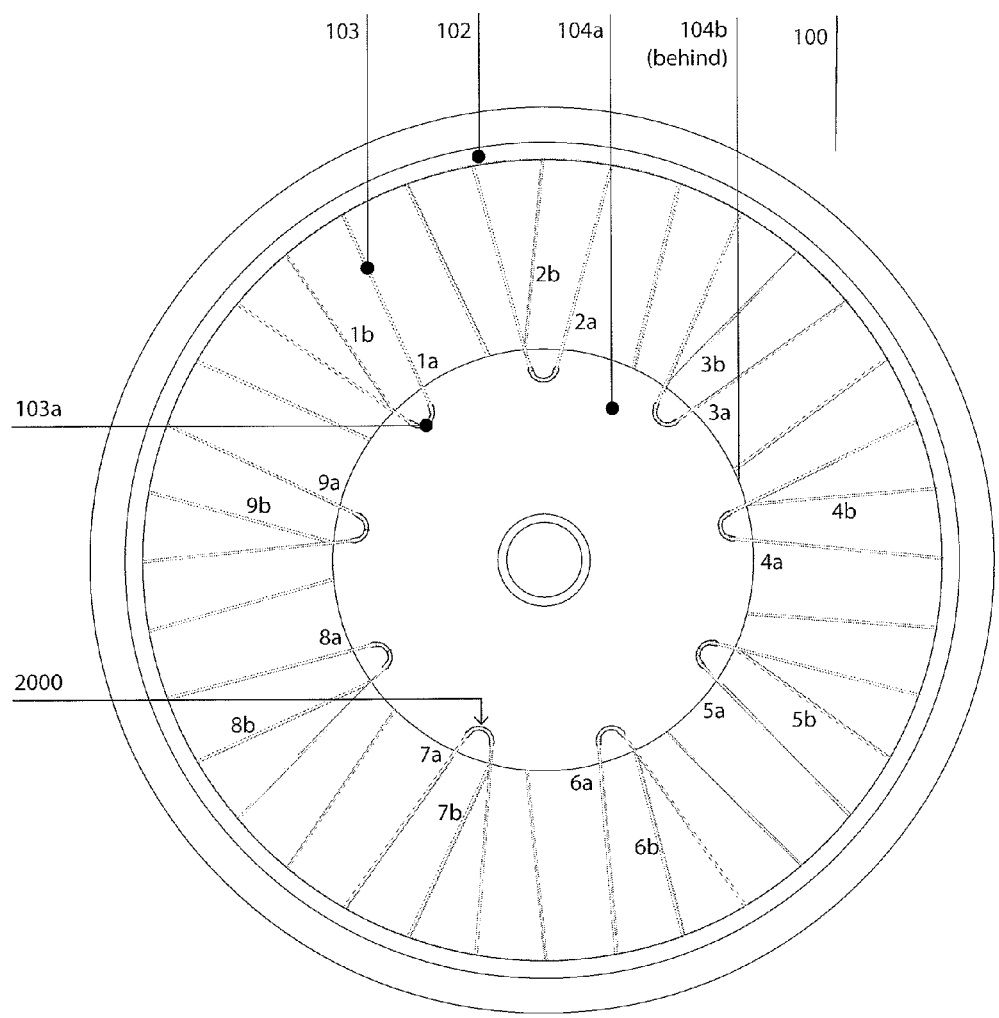
FIGS. 7A-7E illustrate wheel spoke configurations, in accordance with embodiments of the present inventive concepts.
Figure 7B:
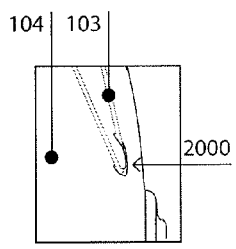

Referring to FIGS. 7A and 7B, in some embodiments, the curved portions 103a of the bent spokes 103 can interface with curved spoke pockets 2000 provided on sides of the wheel hub 104. The curved spoke pockets 2000 can be provided as indentations within the outer casing of the wheel hub 104.

Figure 7C:
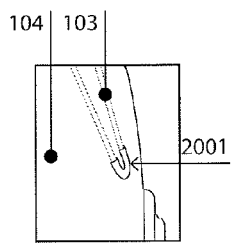

Referring to FIG. 7C, in some embodiments, the curved portions 103a of the bent spokes can interface with an enclosed channel provided within the outer casing of the hub wheel 104. As such, wire or rope wheel spokes 103 can be threaded through the enclosed channel 2001.

Figure 7D:
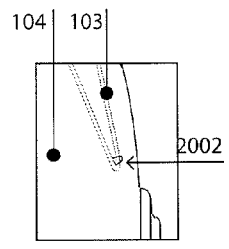

Referring to FIG. 7D, in some embodiments, the curved portions 103a of the bent spokes can interface with hooks or protrusions 2002 provided on sides of the wheel hub 104.

Figure 7E:
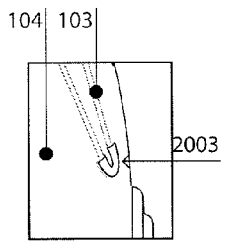

Referring to FIG. 7E, in some embodiments, the curved portions 103a of the bent spokes can interface with an external clasp 2003 provided on the outer casing of the hub wheel 104.

Although the illustrated wheel spoke configuration of FIG. 7 comprises 18 bent wire wheel spokes 103, the spoking concept described herein can be adapted and modified for to include any number 'n' of bent wire wheel spokes by a skilled artisan after a full and complete disclosure of the present application. In addition, the wheel spokes may comprise of other materials, including, but not limited to wire rope, or mesh. Moreover, the wheel spoking configuration described herein can be adapted and modified for any type of vehicle wheel (e.g., automobile, motorcycle, scooter, ext . . . ) by a skilled artisan after a full and complete disclosure of the present application.

FIG. 8 is a block diagram of a control and sensor system and a motor controller for a hybrid sensor-enabled electric wheel.

The control unit 114 can comprise a micro-processing system 811, an optional Bluetooth communications unit 810, an accelerometer 813, a telecommunications and global positioning system unit 815 and a plurality of environmental sensors 816, 817, 821, 822.

The micro-processing system 811 can be configured to communicate with and control the motor controller 112, and can comprise a debug serial port 814 and a PGM port 812. In this exemplary embodiment, the input/output lines of the micro-processing system 811 are connected to the output/input lines of the micro-processing system 801 of the motor controller 112, respectively. In some embodiments, the connection between the micro-processing system 811 of the control unit 114 and the micro-processing system 801 of the motor controller 112 can be isolated.

The environmental sensor 816 can comprise a gas analyzer capable of measuring at least one of CO, NOx, $O_2$ and $O_3$ content. The environmental sensor 817 can comprise a particulate sensor for measuring large and small air particulates. The environmental sensor 821 can comprise a temperature and humidity sensor for measuring ambient temperature and relative humidity. The environmental sensor 822 can comprise a noise sensor for measuring environmental noise pollution.

The telecommunications and global positioning system unit 815 can comprise a global positioning system (GPS) unit that can provide location and time data, and a telecommunications system unit that can provide access to mobile/cellular data networks. In one embodiment, the telecommunications system unit comprises a general packet radio service (GPRS) unit that can provide access to 2G and 3G cellular communications systems. However, the telecommunications system unit can comprise various other types of 2G, 3G and 4G telecommunications systems.

The motor controller 112 can comprise a micro-processing system 801, an optional Bluetooth communications unit 810, a power supply 805, a 3-phase brushless DC motor driver 804 and a piezo alarm buzzer 821.

The 3-phase brushless DC motor driver 804 generates 3 phases of drive current 804a based on the rotor 120 position/orientation in response to drive signals output by the micro-processing system 801. The motor controller 112 can determine the rotor position/orientation using hall effect sensors 804b, rotary position sensors, or by measuring the back EMF in undriven coils. In other embodiments, the motor controller 112 can comprise a motor driver associated with the specific type of motor 135 integrated within the wheel 100.

In some embodiments, the hybrid sensor-enabled electric wheel systems 112, 114 can be configured and/or controlled via a wireless control system 5000. The wireless control system can comprise a micro-processing system 823, a low battery light 824, an display 825, a mode selector button 826, a Bluetooth communications unit 810 and a Bluetooth connection light 827.

The wireless control system 5000 can be configured to wirelessly communicate with the systems 112, 114 via the Bluetooth communications unit 810 or other wireless communication protocol device. The wireless control system 5000 is provided with a Bluetooth connection light 827, which can indicate a connection status with the systems 112, 114 of the wheel 100.

The wireless control system 5000 can be configured to access, receive and display various types of data collected by sensors of the wheel, and can configure the data collection processes. For example, the wireless control system 5000 can configure the control unit 114 and sensor systems of the wheel 100 to collect various types of environmental and location data.

The wireless control system 5000 can also be configured to control operational modes of the hybrid sensor-enabled and autonomous electric wheel 100. For example, a cyclist can configure the wheel 100, via the wireless control system 5000, to operate in an energy regeneration mode or exercise mode such that an electric motor 135 of the wheel 100 generates and transfers electrical energy to the one or more batteries or energy storing devices 113 of the wheel 100 while the cyclist is pedaling.

Figure 9A:
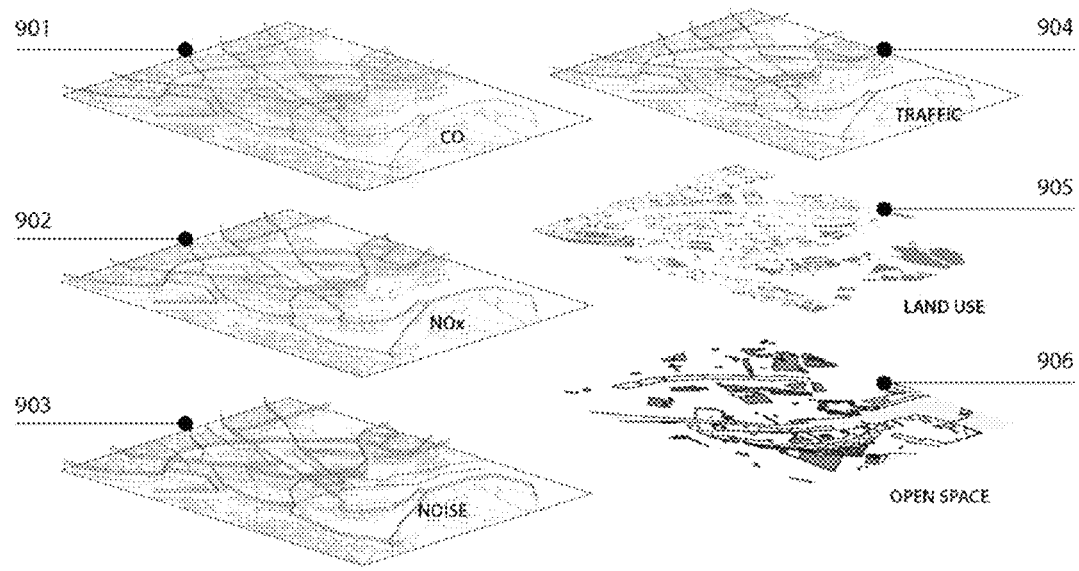
FIGS. 9A and 9B are 3-dimensional graphs of urban data collected by a hybrid sensor-enabled electric wheel, in accordance with embodiments of the present inventive concepts.
Figure 9B:
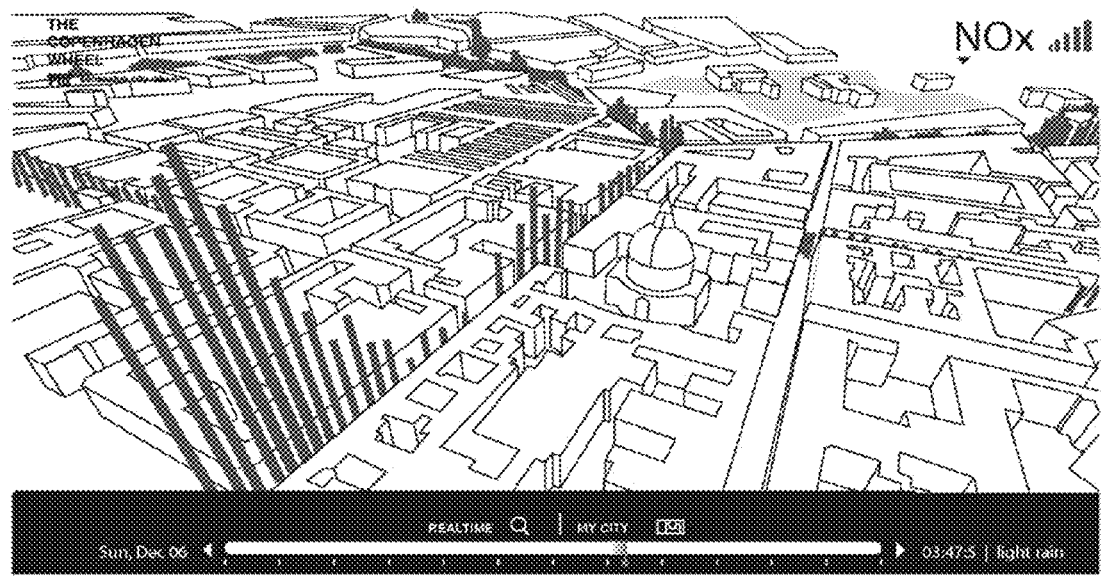

FIGS. 9A and 9B are 3-dimensional graphs of urban data collected by a hybrid sensor-enabled electric wheel.

As a cyclist rides, a global positioning system (GPS) unit and one or more sensing units 115 of the hybrid sensor-enabled and autonomous electric wheel 100 capture information about a cyclist's personal riding habits including location and time data, and caloric loss data, as well as environmental information including carbon monoxide data, NOx data, noise data, ambient temperature data and relative humidity data.

In some embodiments, the cyclist can access this data through a smartphone, or via the internet, which can help a cyclist plan healthier bike routes, achieve exercise goals, or to meet up with friends on the go. The cyclist can also share collected data with friends, through online social networks, or with researchers through online data collection warehouses.

Data collected from the plurality of sensors in 115 can be analyzed and the results can be made available to the cyclist via an Internet application. The collected data can also be made available to a cyclist in real time via a smartphone wirelessly connected to the wheel 100.

Cyclists who wish to can share the data they are collecting with a city bike system. The city bike system and applications can provide cities with the ability to query the aggregated data that is collected by cyclists, which can be used in planning and design decision-making processes.

The data collected by the wheel can be used in combination with caloric loss data and torque information to provide cyclists with statistical and real-time information about their physical performance while riding.

Information about cyclist routes can be analyzed to produce information about the cyclists' environmental impact including: a comparison between travel with different modes of transportation (car, motorbike, bike, walk, etc.).

A Green Mileage Scheme can provide an incentive for cyclists to use their bike more. It can allow cyclists to collect the number of 'green miles' they cycle, to compete with friends or to exchange miles for goods and services in the city.

A Real-Time Delivery Service community can be created using the rich data collection features of the wheel 100. The service can exploit the untapped freight capacity of cyclists for delivering goods within a city. Members of the community can contact other members via text message or an alert on via a smartphone and offer incentives for delivering goods to their final destination.

Referring to FIG. 9A, the data collected from sensors on the bike can generate detailed analyses of temporal environmental phenomena in cities. This can include CO levels (901); NOx levels (902); noise levels (903); and traffic patterns and congestion (904). This information can be overlaid on existing street patterns, land use maps (905) and open space maps (906) to create a tool cities and individuals can use, for example, to monitor environmental conditions; for future environmental and traffic policy decisions; real time traffic analysis; the study of phenomena like urban heat islands, noise and environmental pollution; and when planning the least polluted routes through cities. Referring to FIG. 9B, detailed 3D maps of environmental pollutants in cities can be generated through the data collected on the bikes. These maps that can be accessed through mobile devices or a standard webpage and can provide an overview of environmental conditions in real time, as well as historical data detailing past conditions or predictions of future conditions.

In this way, they can be seen as a tool for planning new routes in cities as well as analyzing future and past conditions.

FIGS. 10A-10B are drawings and an image of a hybrid sensor-enabled electric wheel installed on a bicycle. After the wheel 100 is secured to the frame 1000 of the bicycle using a mechanical coupling mechanism 1005, which may be a shaft, the torque arm 186 is attached to the frame 1000 and a bicycle chain 1002 is installed. The bicycle chain 1002 is connected to a pedal sprocket 1001 of the mechanical drive unit 190, that drives and the inner wheel hub gear system 140 of the wheel 100. The mechanical drive unit may include a sprocket or gears. In this manner, a cyclist can apply positive or negative torque to the inner wheel hub gear system 140 via the bicycle pedals 1003, pedal sprocket 1001 and bike chain 1002.

Referring to FIG. 10C, a smartphone is shown secured to a handlebar of a two-wheeled bicycle. The smartphone 1050 (optional) can be secured to the handlebar 1051 of the bicycle via a handlebar control unit 1052.

The smartphone 1050 can be configured to wirelessly communicate with the hybrid sensor-enabled and autonomous electric wheel 100 via Bluetooth, or other wireless protocol, and can configure operating modes of the wheel 100 and/or access and receive various types of data collected by sensors of the wheel 100.

In some embodiments, a cyclist can configure the wheel 100 to operate in at least one of the following operational modes:

OFF MODE: The motor 135 of the wheel 100 is deactivated (i.e., off), and the bike can be pedaled and ridden normally. In this mode, regenerative braking, mechanical braking and gear changes are enabled.

PEDAL ASSIST 1/2/3: The motor 135 of the wheel 100 is activated (i.e., enabled) and supplies a predetermined magnitude of torque. In some embodiments, the motor 135 multiples the cyclist torque by ×1, ×1.5 or ×2.

EXERCISE 1/2/3: The motor 135 of the wheel 100 is configured as a generator, and the one or more batteries or charge storage devices 113 are charged by the cyclist. In one embodiment, there are three different modes for exercise in this setting: easy, medium and hard.

SMOOTH ZERO EMISSION: In Zero Emission mode the bike uses the energy that is collected while braking (regenerative braking) to make the ride smoother for the cyclist. For example, energy collected while going downhill is released when going uphill. The amount of energy released is calculated so that the total balance is zero. Accordingly, a smoother ride can be achieved without the need of energy supplementation from the grid to charge the batteries.

The hybrid sensor-enabled and autonomous electric wheel 100 can comprise a battery management system, which the smartphone can be configured to wirelessly communicate with via Bluetooth, or other wireless protocol. The battery management system can communicate to the smartphone 1050 the battery charge level of the one or more batteries or charge storage devices 113 of the wheel 100.

The smartphone 1050 can further activate or deactivate an integrated locking and alarm system of the wheel 100. The integrated locking and alarm system can be activated wirelessly via the smartphone 1050 or can be armed with a key switch on the hub.

When locked, the control unit 114 of the wheel 100 can configure the motor drive 804 of the motor controller 112 to enter a high-impedance state thereby preventing axial rotation AR of the wheel 100. In addition, the alarm system can be configured to detect undesired movement of the wheel 100 via the accelerometer 813 of the control unit 114. When undesired movement is detected an audible alarm can sound. Further, the control unit 114 can be configured to report GPS coordinates and a time stamp when the alarm is triggered. In some embodiments, the control unit 114 can report the GPS coordinates and time stamp by sending an electronic message, such as an email message or txt message, via the control units 114 telecommunications system unit.

While the present inventive concepts have been particularly shown and described above with reference to exemplary embodiments thereof, it will be understood by those of ordinary skill in the art, that various changes in form and detail can be made without departing from the spirit and scope of the present inventive concepts described above and defined by the following claims.

What is claimed is:

1. A device of an electrically motorized wheel to convert a non-motorized wheeled vehicle to an electrically motorized wheeled vehicle via installation of the device to a wheel of the non-motorized wheeled vehicle, the device comprising:
a static unit and a rotating unit around an axis of rotation, the static unit coupled to the non-motorized wheeled vehicle;
an electric motor selectively operable to rotate the rotating unit relative to the static unit;
a mechanical drive unit coupled to the rotational unit, the mechanical drive unit operable to rotate the rotational unit in response to a rotational input applied by the user;
a sensing system mounted to the electrically motorized wheel, the sensing system adapted to identify parameters indicative of the rotational input;
a control unit mounted to the electrically motorized wheel, the control unit in communication with the sensing system to continuously control the electric motor in response to the rotational input; and
a power source mounted to the electrically motorized wheel, the power source electrically connected to the control unit and the electric motor.

2. The device of claim 1, wherein the sensing system is adapted to sense the rotational input applied by the user to the mechanical drive unit and to provide an indication of the sensed rotational input to the control unit such that the control unit continuously adjusts drive torque of the electric motor in response to the indication of the sensed force.

3. The device of claim 2, wherein the rotational input applied by the user causes a positive torque on the mechanical drive unit, and in response to the positive torque, the control unit causes the electric motor to supplement the rotational input exerted by the user with a positive torque to the rotating unit.

4. The device of claim 3, wherein the rotational input applied by the user causes a negative rotation of the mechanical drive unit, and in response thereto, the control unit causes the electric motor to oppose rotation of the rotating unit.

5. The device of claim 1, wherein the electric motor generates electrical energy.

6. The device of claim 1, wherein the electrical energy generated by the electric motor is stored in the power source.

7. The device of claim 1, wherein the power source includes batteries positioned at least partially around the axis, the batteries completely enclosed within the motorized wheel.

8. The device of claim 1, wherein the sensing system, and the control unit are completely enclosed within the motorized wheel.

9. The device of claim 1, wherein the rotating unit is fixed to a wheel rim and rotates with the wheel rim.

10. The device of claim 9, wherein the rotating unit rotates around the static unit.

11. The device of claim 9, wherein the mechanical drive unit includes a sprocket to receive a chain.

12. The device of claim 11, wherein the non-motorized wheeled vehicle is a bicycle, the electrically motorized wheel connects to the non-motorized bicycle without structural modifications of the non-motorized bicycle.

13. The device of claim 11, wherein the non-motorized wheeled vehicle is a bicycle having at least one pedal mechanically coupled to the sprocket through the chain to apply the rotational input of the user to the rotating unit.

14. The device of claim 13, wherein a back pedaling input applied by a user applies a reverse rotation to the mechanical drive unit, the reverse rotation being a direction of rotation opposite that which moves the vehicle in a forward direction, and in response to the reverse rotation, the control unit commands the electric motor to oppose the rotation of the rotating unit.

15. The device of claim 14, wherein the electrical motor generates electrical energy.

16. The device of claim 15, wherein the electrical energy generated by the electric motor is stored.

17. The device of claim 1, wherein the sensing system measures at least one of a rotational velocity and a torque applied to the mechanical drive unit.

18. A device for converting a bicycle to an electrically motorized bicycle with an electrically motorized wheel comprising:
   a mechanical drive unit adapted to mechanically interact with a user;
   a self-enclosed motorized hub unit comprising:
      a rotating unit adapted to be driven by the mechanical drive unit;
      a static unit;
      a sensing system adapted to identify a force applied by the user to a mechanical drive unit coupled to the motorized hub unit;
      an electric motor;
      a control unit configured to continuously control the electric motor in response to the mechanical interaction between a force applied by the user; and
      a power source electrically connected to the control unit and the electric motor;
   wherein the sensing system comprises:
      a first sleeve secured to the mechanical drive unit;
      a second sleeve secured to the rotating unit; and
      at least one of: a proximity sensor, a pressure sensor, and displacement sensor that measures relative position of the first sleeve to the second sleeve.

19. A device for converting a bicycle to an electrically motorized bicycle with an electrically motorized wheel comprising:
   a shaft for securing the electrically motorized wheel to the bicycle;
   a mechanical drive unit adapted to mechanically interact with a user;
   a self-enclosed motorized hub unit comprising:
      a rotating unit adapted to be driven by the mechanical drive unit;
      a static unit;
      a sensing system adapted to identify a force applied by the user to a mechanical drive unit coupled to the motorized hub unit;
      an electric motor;
      a control unit configured to continuously control the electric motor in response to the force applied by the user;
      a power source electrically connected to the control unit and the electric motor;
   wherein the sensing system comprises at least one pressure sensor between the shaft and at least one of: the mechanical drive unit and a structure coupled to the mechanical drive unit for measuring force applied due to the mechanical interaction with the user.

20. A device for converting a bicycle to an electrically motorized bicycle with an electrically motorized wheel comprising:
   a shaft for securing the electrically motorized wheel to the bicycle;
   a mechanical drive unit adapted to mechanically interact with a user;
   a self-enclosed motorized hub unit comprising:
      a rotating unit adapted to be driven by the mechanical drive unit;
      a static unit;
      a sensing system adapted to identify a force applied by the user to a mechanical drive unit coupled to the motorized hub unit;
      an electric motor;
      a control unit configured to continuously control the electric motor in response to the force applied by the user; and
      a power source electrically connected to the control unit and the electric motor;
   wherein the sensing system comprises a sensor for measuring bending of the shaft.

21. The device of claim 1, further comprising a gear system between the electric motor and the rotating unit.

22. The device of claim 1, wherein the control unit controls the electric motor in response to a command signal wirelessly received from a wireless device.

23. The device of claim 1, wherein the control unit is configured to transmit or receive signals via one or more wireless networks.

24. The device of claim 1, wherein the control unit is configured to wirelessly interface with at least one external sensor.

25. The device of claim 1, further comprising:
   a plurality of spokes connecting the wheel rim to the motorized hub unit;
   wherein each of the plurality of spokes has first and second ends that extend at an acute angle with respect to each other creating an attachment portion;
   wherein the ends attach to the rim, the attachment portions attach to the hub thereby causing the motorized hub unit to be secured between the attachment portions of the plurality of spokes.

26. The device of claim 1, wherein the sensing system measures rotational velocity of the mechanical drive unit.

27. The device of claim 1, wherein the sensing system measures the linear acceleration of the electrically motorized wheeled vehicle.

28. The device of claim 1, wherein the electrically motorized wheel connects to the non-motorized vehicle without requiring structural modifications of, or additions to, the non-motorized vehicle.

29. The device of claim 1, wherein the rotational input is a pedaling input applied by the user, the sensing system adapted to sense the pedaling input by the user and to provide an indication pedaling input to the control unit;

the control unit causes the electric motor to augment rotation of the rotating unit in response to the indication of the pedaling input.

30. The device of claim 18 wherein the electrically motorized wheel connects to the non-motorized bicycle without requiring structural modifications of, or additions to, the non-motorized bicycle.

31. The device of claim 19 wherein the electrically motorized wheel connects to the non-motorized bicycle without requiring structural modifications of, or additions to, the non-motorized bicycle.

32. The device of claim 12, wherein the electrically motorized wheel connects to the non-motorized bicycle as a rear wheel.

33. The device of claim 20 wherein the electrically motorized wheel connects to the non-motorized bicycle without requiring structural modifications of the non-motorized bicycle.

34. The device of claim 1, wherein the sensing system is completely enclosed within the motorized wheel.

35. The device of claim 1, wherein the control unit is completely enclosed within the motorized wheel.

36. The device of claim 1, wherein the power source is completely enclosed within the motorized wheel, the power source accessible through a cover in the rotating unit.

37. The device of claim 1, wherein the electric motor is completely enclosed within the motorized wheel.

38. The device of claim 37, wherein a stator of the electric motor is in one of the static unit and the rotating unit, and a rotor of the electric motor is in the other of the static unit and the rotating unit.

39. The device of claim 38, wherein the stator and the rotor are coaxial with the axis.

40. The device of claim 1, wherein the static unit is coupled to the non-motorized wheeled vehicle via a torque arm that extends from the static unit.

41. A device of an electrically motorized wheel to convert a non-motorized wheeled vehicle to an electrically motorized wheeled vehicle via installation of the device to a wheel of the non-motorized wheeled vehicle, the device comprising:
   a wheel hub static unit and a wheel hub rotating unit around an axis of rotation, the wheel hub static unit coupled to the non-motorized wheeled vehicle;
   an electric motor including a stator and a rotor enclosed within the motorized wheel hub, the stator is in one of the wheel hub static unit and the wheel hub rotating unit, and the rotor is in the other of the wheel hub static unit and the wheel hub rotating unit, the electric motor selectively operable to rotate the wheel hub rotating unit relative to the wheel hub static unit;
   a mechanical drive unit coupled to the wheel hub rotational unit, the mechanical drive unit adapted to rotate the wheel hub rotational unit in response to a pedaling input applied by a user;
   a sensing system mounted to the wheel hub static unit and enclosed within the motorized wheel hub, the sensing system adapted to identify parameters indicative of the pedaling input applied to the mechanical drive unit;
   a control unit mounted to the wheel hub static unit and enclosed within the motorized wheel hub, the control unit in communication with the sensing system to control the electric motor in response to the pedaling input; and
   a power source mounted to the wheel hub static unit and enclosed within the motorized wheel hub, the power source electrically connected to the control unit, the sensing system, and the electric motor.

42. The device of claim 41, wherein the control unit is operable to communicate with a wireless device.

43. The device of claim 42, wherein the wireless device is operable to collect various types of environmental and location data from the sensing system.

44. The device of claim 41, wherein the control unit is configurable in response to a wireless device.

45. The device of claim 44, wherein the control unit is configurable to provide an energy regeneration mode.

46. The device of claim 45, wherein the control unit is configurable to provide an exercise mode.

47. The device of claim 41, wherein the pedaling input to the mechanical drive unit is communicated through a torque sensing system measuring a deflection of a shaft that supports the motorized wheel hub.

48. The device of claim 39, wherein the electrically motorized wheel mounts to the non-motorized bicycle as a rear wheel.

49. The device of claim 39, wherein the wheel hub static unit is coupled to the non-motorized wheeled vehicle via a torque arm that extends from the wheel hub static unit.

50. The device of claim 49, wherein the electrically motorized wheel is removably mounted to the non-motorized bicycle without structural modifications of the non-motorized bicycle.

51. The device of claim 49, wherein the mechanical drive unit includes a sprocket to receive a chain.

52. The device of claim 51, wherein the non-motorized wheeled vehicle is a bicycle having at least one pedal mechanically coupled to the sprocket through the chain to apply the pedaling input of the user to the wheel hub rotating unit.

53. The device of claim 41, wherein the control unit is completely enclosed within the motorized wheel hub.

54. The device of claim 41, wherein the power source is completely enclosed within the motorized wheel hub, the power source accessible through a cover in the rotating unit.

55. The device of claim 41, wherein the electric motor is completely enclosed within the motorized wheel hub.

56. The device of claim 41, wherein the control unit, the power source, and the electric motor is completely enclosed within the motorized wheel hub.

57. The device of claim 1, wherein to continuously control the electric motor includes controlling the electric motor while the electric motor is active and inactive.

58. The device of claim 41, wherein the control unit is in communication with the sensing system to continuously control the electric motor in response to the rotational input between the pedaling input applied by the user and the mechanical drive unit.

59. The device of claim 41, wherein to continuously control the electric motor includes controlling the electric motor while the electric motor is active and inactive.

60. The device of claim 1, wherein the electric motor generates electrical energy in an energy regeneration mode independent of the rotational input applied by the user.

61. The device of claim 1, wherein the device is a hub.

62. The device of claim 1, wherein the sensing system measures rotational velocity of the mechanical drive unit via a hall effect sensor.

63. The device of claim 1, wherein the sensing system measures rotational velocity of the mechanical drive unit via displacement of a shaft relative the axis of rotation.

64. The device of claim 1, wherein the sensing system measures rotational velocity of the mechanical drive unit via relative movement between two concentric sleeves.

65. The device of claim 1, wherein the sensing system measures rotational velocity of the mechanical drive unit via a first sleeve secured to the mechanical drive unit, a second sleeve secured to the rotating unit; and a sensor that measures relative position of the first sleeve to the second sleeve.

66. The device of claim 65, wherein the sensor is a hall effect sensor.

67. The device of claim 41, wherein the sensing system measures rotational velocity of the mechanical drive unit via a first sleeve secured to the mechanical drive unit, a second sleeve secured to the rotating unit; and a sensor that measures the relative position of the first sleeve to the second sleeve.

68. The device of claim 67, wherein the sensor is a hall effect sensor.

69. The device of claim 41, wherein the sensing system measures rotational velocity of the mechanical drive unit via displacement of a shaft relative the axis of rotation.

70. The device of claim 1, further comprising a hall effect sensor of the sensing system adapted to identify the parameters indicative of the rotational input.

* * * * *

UNITED STATES PATENT AND TRADEMARK OFFICE
CERTIFICATE OF CORRECTION

PATENT NO. : 9,027,681 B2  
APPLICATION NO. : 12/960461  
DATED : May 12, 2015  
INVENTOR(S) : Assaf Biderman et al.

It is certified that error appears in the above-identified patent and that said Letters Patent is hereby corrected as shown below:

In the Drawings

On sheet 1 of 19, in Figure 1A, Reference Numeral 180, line 1, delete "180" and insert -- 186 --, therefor.

On sheet 1 of 19, in Figure 1A, line 5, above "190" insert -- 180 --.

On sheet 18 of 19, in Figure 10B, line 3, below "FIG. 10B" insert -- 186 --.

In the Specification

In column 3, line 2, delete "and or" and insert -- and/or --, therefor.

In column 3, line 11, delete "retrofitable" and insert -- retrofittable --, therefor.

In column 19, line 10, after "drives" delete "and".

In the Claims

In column 20, line 57, in claim 6, delete "claim 1," and insert -- claim 5, --, therefor.

In column 21, line 13, in claim 14, delete "back pedaling" and insert -- back-pedaling --, therefor.

In column 23, line 17, in claim 33, delete "of" and insert -- of, or additions to, --, therefor.

Signed and Sealed this  
Twenty-ninth Day of September, 2015

Michelle K. Lee  
*Director of the United States Patent and Trademark Office*